United States Patent
Ishii et al.

(10) Patent No.: US 6,844,843 B2
(45) Date of Patent: Jan. 18, 2005

(54) SIGNAL PROCESSING APPARATUS OF RADIO RADAR

(75) Inventors: Satoshi Ishii, Kawasaki (JP); Yoshikazu Dooi, Kawasaki (JP); Sadanori Matsui, Kobe (JP)

(73) Assignees: Fujitsu Limited, Kawasaki (JP); Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/716,515

(22) Filed: Nov. 20, 2003

(65) Prior Publication Data
US 2004/0108952 A1 Jun. 10, 2004

(30) Foreign Application Priority Data
Nov. 25, 2002 (JP) ........................ 2002-341029

(51) Int. Cl.$^7$ ............................. G01S 13/34; G01S 7/40
(52) U.S. Cl. ............................. 342/91; 342/89; 342/92; 342/93; 342/118; 342/128; 342/165; 342/173; 342/175; 342/195; 342/196
(58) Field of Search ......................... 342/118, 128–133, 342/104–117, 13–20, 42, 45, 89–103, 165–175, 192–197

(56) References Cited

U.S. PATENT DOCUMENTS

| | | | | |
|---|---|---|---|---|
| 4,194,205 A | * | 3/1980 | Willmore et al. | ............ 342/173 |
| 4,328,497 A | * | 5/1982 | Vale | ............................. 342/18 |
| 4,581,767 A | * | 4/1986 | Monsen | ........................ 342/14 |
| 5,359,329 A | * | 10/1994 | Lewis et al. | ................... 342/17 |
| 5,379,043 A | * | 1/1995 | Bishop | ......................... 342/45 |
| 6,043,770 A | * | 3/2000 | Garcia et al. | .................. 342/13 |
| 6,480,139 B1 | * | 11/2002 | Hoctor | ......................... 342/13 |
| 6,483,452 B1 | * | 11/2002 | Iwakini | ........................ 342/20 |
| 6,639,541 B1 | * | 10/2003 | Quintana et al. | ............. 342/18 |

FOREIGN PATENT DOCUMENTS

| | | |
|---|---|---|
| JP | 10-062525 A | 3/1998 |
| JP | 10-282229 A | 10/1998 |
| JP | 11-109030 A | 4/1999 |
| JP | 2001-141804 A | 5/2001 |

* cited by examiner

Primary Examiner—Bernarr E. Gregory
(74) Attorney, Agent, or Firm—Staas & Halsey LLP

(57) ABSTRACT

A signal from CW radar is received, and the received power detected by the CW radar's swinging in all directions is averaged in each direction. Then, the maximum value and the minimum value of the received power are detected for each direction, and the difference between the maximum value and the minimum value is computed. An average power value of obtained power is also computed. On a 2-dimensional plane on which the difference between the maximum value and the minimum value and the average power value are used for coordinate axes, slice processing is performed using a threshold indicated by a line graph or a curve.

25 Claims, 32 Drawing Sheets

GRAPH OF FREQUENCY AND TIME DURING EMISSION/RECEPTION

FFT RESULT OF RECEIVED SIGNAL

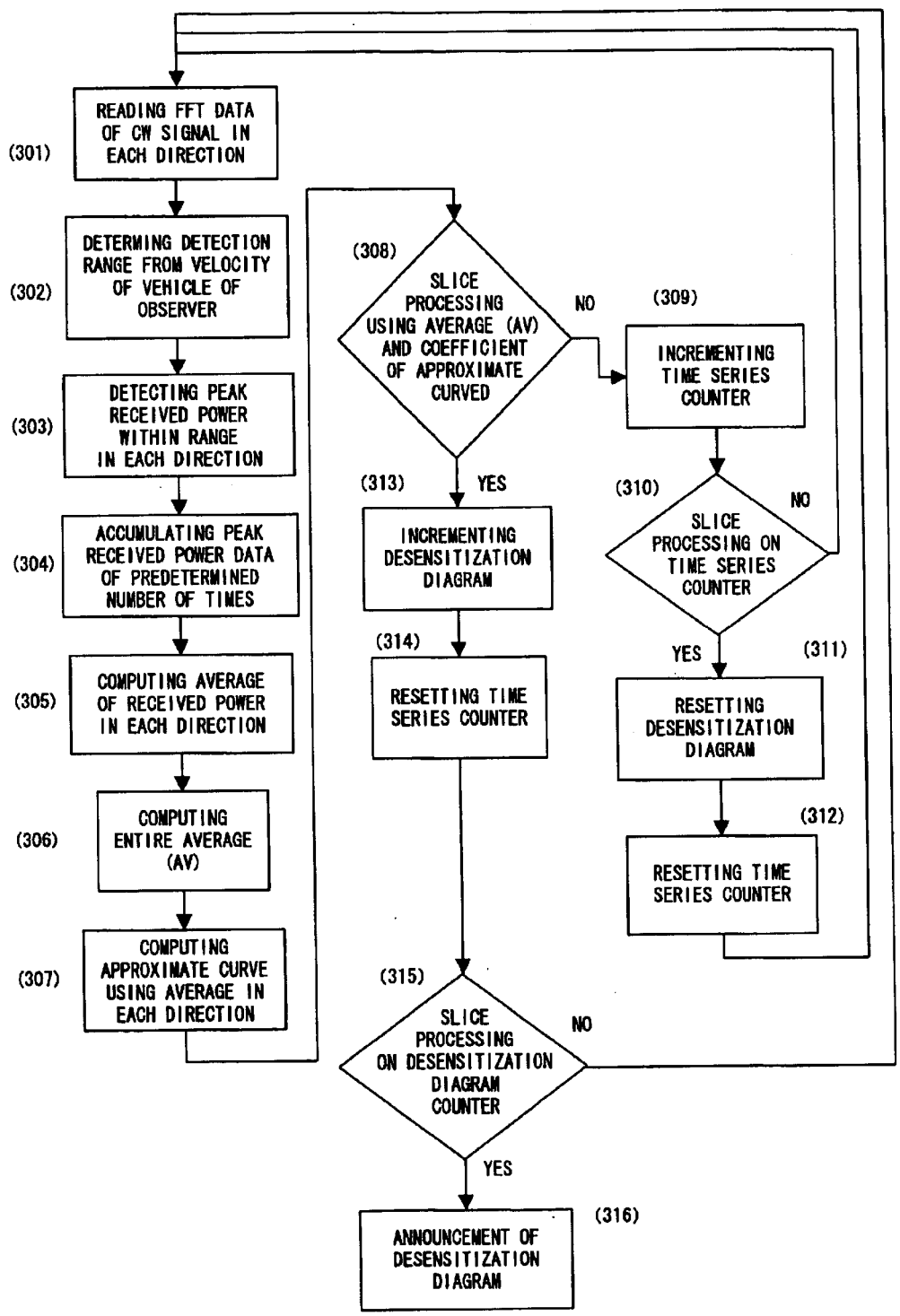
F I G. 19

SIGNAL PROCESSING APPARATUS OF RADIO RADAR

BACKGROUND OF THE INVENTION

1. Field of the Invention

The present invention relates to a signal processing apparatus for making a self-diagnostic check of the desensitization of a transmitted/received signal of radar in the signal processing of radio radar.

2. Description of the Related Art

Recently, the travel control technology for vehicles has been remarkably developed, and various systems of supporting the driving operation of a driver have been developed. In these systems, a radio radar unit loaded into a vehicle detects the presence of obstacles around a vehicle, the data of the detection result is processed, and a computer determines how to control the vehicle, for example, applying the brakes, wheeling left or right, etc. The driver controls the vehicle based on the determination of the computer. It is also planned to apply these systems to a future automatic driving system.

A conventional apparatus for detecting a fault in a radio radar unit can be the apparatus described in the patent document 1. The apparatus described in the patent document 1 has a modulator for performing modulation for detection of a fault, detects a modulation component in reflected waves, thereby determining a fault.

[Patent Document 1]

Japanese Patent Application Laid-open No.10-62525

FIG. 1 shows an example of using radio radar.

A radio radar unit is loaded into a vehicle, etc., measures a preceding car, etc., and performs control such as homing guidance, immediate brakes, etc. on the vehicle according to the information. A radio radar unit loaded into a vehicle is often used in the FM-CW system to obtain data of a preceding car, etc. The CW system can also be used to obtain self-diagnostic check data.

FIG. 2 shows the concept of the radio radar.

Radio waves are emitted from a radio wave transmitter which is an antenna, and reflected radio waves are received by a radio wave receiver which is also an antenna. In the signal processing, the propagation time of radio waves and a Doppler shift are measured, and they are converted into a distance and a velocity.

FIGS. 3 through 13 show the concept of the principle of the operation of radio radar and the conventional problems.

FIG. 3 is a graph showing a horizontal axis indicating time and a vertical axis indicating frequency. The triangular wave in the solid line indicates the frequency of emitted radio waves. The triangular wave in the chain line indicates received radio waves from an object standing still at a distance D, and it is apparent that there occurs the displacement by an emission time. Obtaining the difference between a transmitted wave and a received wave proportional to a propagation time is simpler than direct measurement of a propagation time.

As shown in FIG. 4, a frequency difference fr signal (referred to as a beat signal) between the transmission and the reception is generated, the beat signal is sampled in the rise section and the fall section of a triangular wave, a Fourier transform is performed on each of them, thereby obtaining electric power. As a result, there occurs a peak in the frequency difference fr, the peak is detected, and the distance D is obtained from the fr.

FIG. 5 shows the state of the received radio wave from an object having a traveling velocity V at a distance D. There occur the displacement by the propagation time and the frequency displacement fd of the Doppler shift. In the rise section and the fall section of a triangular wave, a beat signal is sampled, and each of the beat signals is Fourier-transformed, thereby obtaining electric power. As a result, a frequency value peak fup is obtained by subtracting the displacement fd by the Doppler from the frequency difference fr generated depending on the propagation time in the rise section, and a frequency value peak fdown is obtained by adding the frequency difference fr generated depending on the propagation time in the fall section to the displacement fd by the Doppler shift. The frequency difference fr is obtained depending on the propagation time in the adding operation, etc. of the fup and the fdown, the displacement fd by the Doppler shift is obtained in the subtracting operation, etc. of the fup and the fdown, and the obtained values are multiplied by a constant to convert them into distance and velocity values.

FIG. 6 shows the principle of the operation of the CW radio radar.

In the CW system, only the velocity is measured, and those having the same velocity cannot be separated. Unlike the FM-CW system, no frequency modulation is performed, and radio waves at a constant frequency are transmitted. When the traveling velocity is different from the velocity of the vehicle of the present apparatus, a Doppler effect occurs. Therefore, the received signal is mixed with the transmitted signal, and the high frequency component is filtered. Then, only the Doppler signal at a low frequency remains, and the signal is Fourier-transformed. Then, the received power of the reflected wave from an object indicating the difference from the velocity of the vehicle of the observer is obtained. Based on the result, a peak in the frequency range corresponding to the velocity of the vehicle of the observer having an opposite sign is searched, thereby collectively obtaining the received power of the reflected waves from the road structure and the road.

FIG. 7 shows an example of a time chart of the FM-CW mode and the CW mode of the radar loaded into a vehicle.

Since the FM-CW mode detects a preceding car, etc., the operation is continuously performed except when the operation is performed in the CW mode. Since the CW mode is used in the self-diagnostic check of the desensitization, the operation is performed once while operation in the FM-CW mode is performed several times.

Conventionally, the self-diagnostic check of the desensitization has been made based on the level of the received power of the CW signal from the road structure and the road. It is certain that, as shown in FIG. 8, the reflection is mostly received from the road when there are substantially no road structures, and almost the same received power is obtained from any directions as shown in FIG. 9.

FIG. 10 shows a schematic diagram of the histogram of an average value of received results of the received power of a predetermined number of times.

As shown in FIGS. 9 and 10, normal received power can be clearly separated from the received power of desensitization. In a process, the data in the CW mode of several times is accumulated, the entire measurement data is averaged regardless of the direction, the average value is compared with a threshold, and it is determined whether or not the average value is larger than the threshold (hereinafter the processing performed using a threshold as display above is referred to as "slice processing"). It is checked whether or not the value equal to or smaller than the threshold continues in time. If yes, the desensitization is announced.

However, if there is a road structure as shown in FIG. 11, the reflection from the road structure is received from both sides even though the desensitization is detected as shown in FIG. 12. Therefore, if an average value is obtained regardless of the direction, the average value obtained when there are no road structures as indicated by the histogram shown in FIG. 13 cannot be discriminated from the average value obtained when there are a number of road structures with the desensitization, thereby presenting the problem that the desensitization cannot be detected in a self-diagnostic check.

SUMMARY OF THE INVENTION

The present invention aims at providing a signal processing apparatus of radio radar capable of detecting the desensitization of the radio radar without fail.

The signal processing apparatus according to the present invention includes: a radio radar unit for emitting/receiving radio waves in different directions; a parameter extraction unit for extracting a plurality of parameters relating to the desensitization from the received radio waves obtained from different directions; and a determination unit for determining whether or not the received power of received waves indicates the desensitization of the radio radar unit using a threshold not constant at least for one parameter in a multidimensional space representing the plurality of parameters using coordinate axes.

In the present invention, the number of parameters for use in detecting the desensitization of the radio radar unit is defined as two or more, the value of received power is treated in slice processing using a threshold, which is not a constant, in a multidimensional space in which the parameters are represented using coordinate axes, thereby determining the occurrence of the desensitization. Therefore, determination of desensitization can be precisely made, and the desensitization of radio radar can be more correctly detected.

BRIEF DESCRIPTION OF THE DRAWINGS

FIG. 19 is a view (1) showing the third embodiment of the present invention;

DESCRIPTION OF THE PREFERRED EMBODIMENTS

According to the embodiments of the present invention, the self-diagnostic check function can be enhanced using in the CW mode not only average information, but also the difference between the maximum and minimum values in direction and the received power of a vehicle obtained in the FM-CW system.

The embodiments of the present invention are described below by referring to the attached drawings. The internal information can be processed after converting it using a logarithm (in a dB system), or processed using an antilogarithm.

Figure 14:
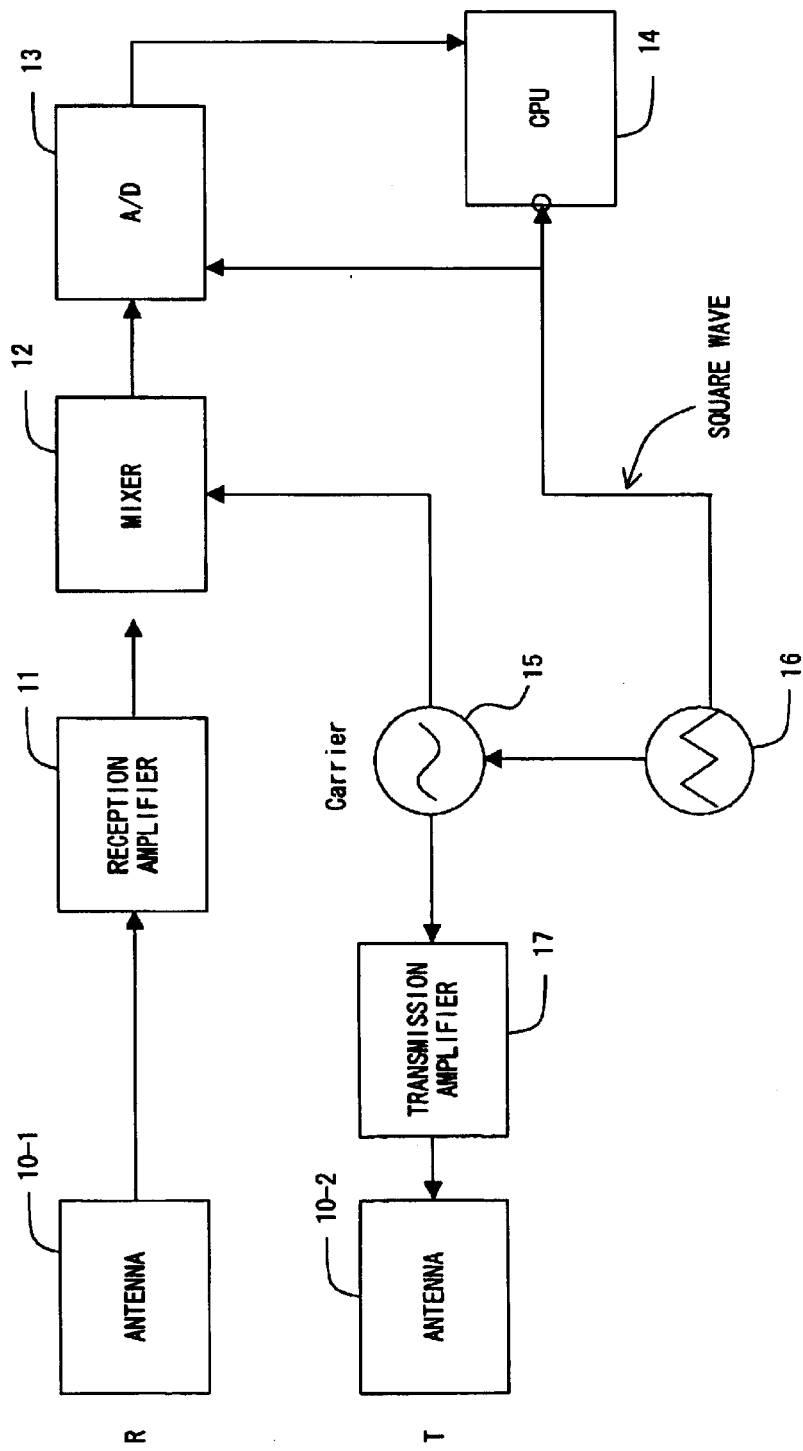
FIG. 14 shows the outline of the configuration of the radio radar system according to an embodiment of the present invention.

FIG. 14 shows the outline of the configuration of the radio radar system according to an embodiment of the present invention;

A carrier wave oscillator 15 receives frequency-modulation by a signal from a triangular wave generator 16.

The frequency-modulated signal wave is transmitted to a transmission amplifier 17 and amplified, and then transmitted from an antenna 10-2 as a radio wave of the radar.

The transmitted radio wave hits and is reflected by an obstacle, and then received by a receiving antenna 10-1. The received signal is amplified by a reception amplifier. 11, and is mixed by a mixer 12 with the signal from the carrier wave oscillator 15, thereby generating a difference signal. The difference signal wave is input into an A/D converter 13. The difference signal converted into a digital signal by the A/D converter 13 is transmitted to a CPU 14, and treated in the signal processing. A square wave, which is an operation clock for the A/D converter 13 and the CPU 14, is output from the triangular wave generator 16, and input to the A/D converter 13 and the CPU 14. According to the operation clock, the CPU 14 detects the rise and fall timings of the frequency of a transmitted wave, and samples a received signal.

Figure 15:
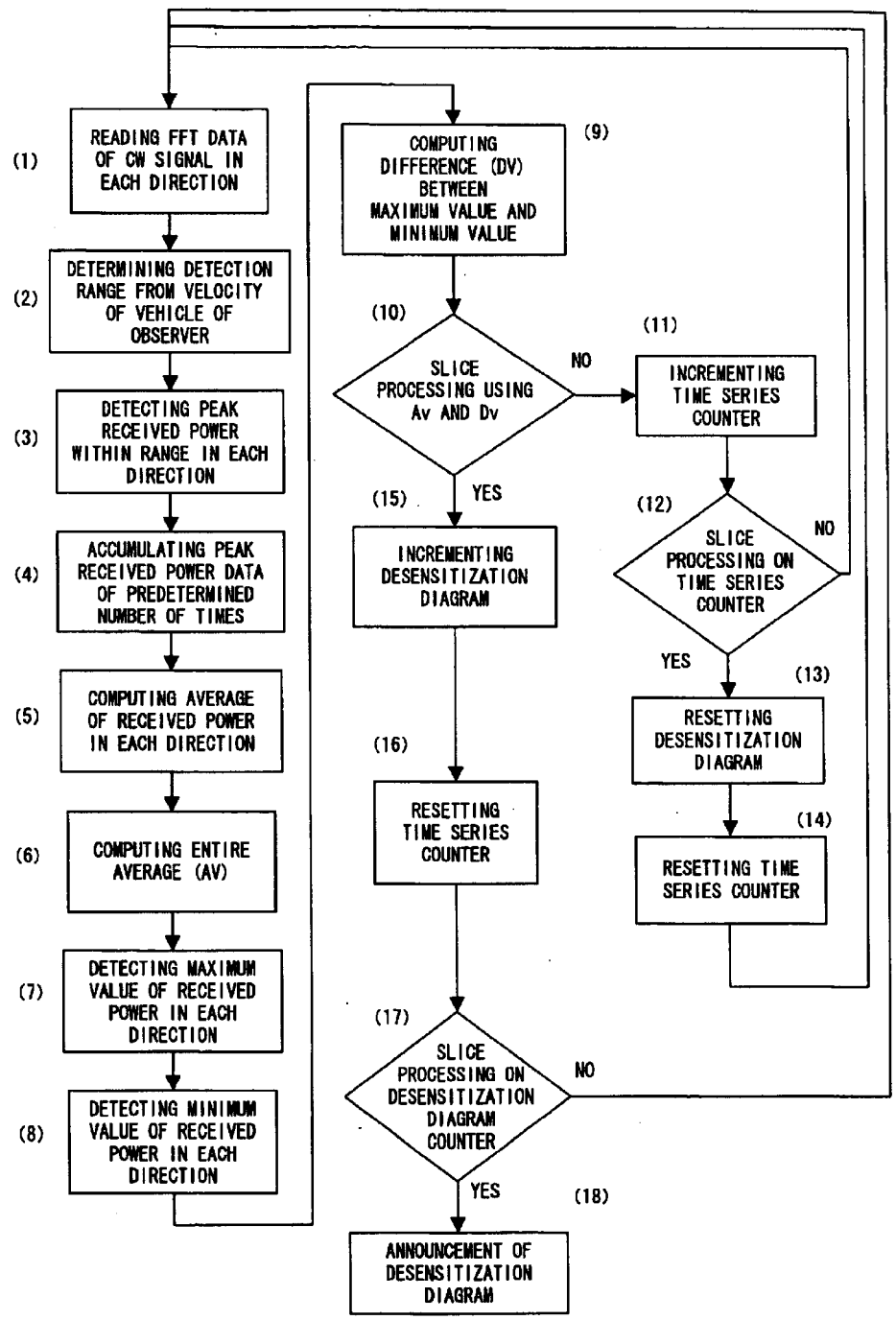
FIG. 15 is a flowchart of the signal processing according to the first embodiment of the present invention.
Figure 16:
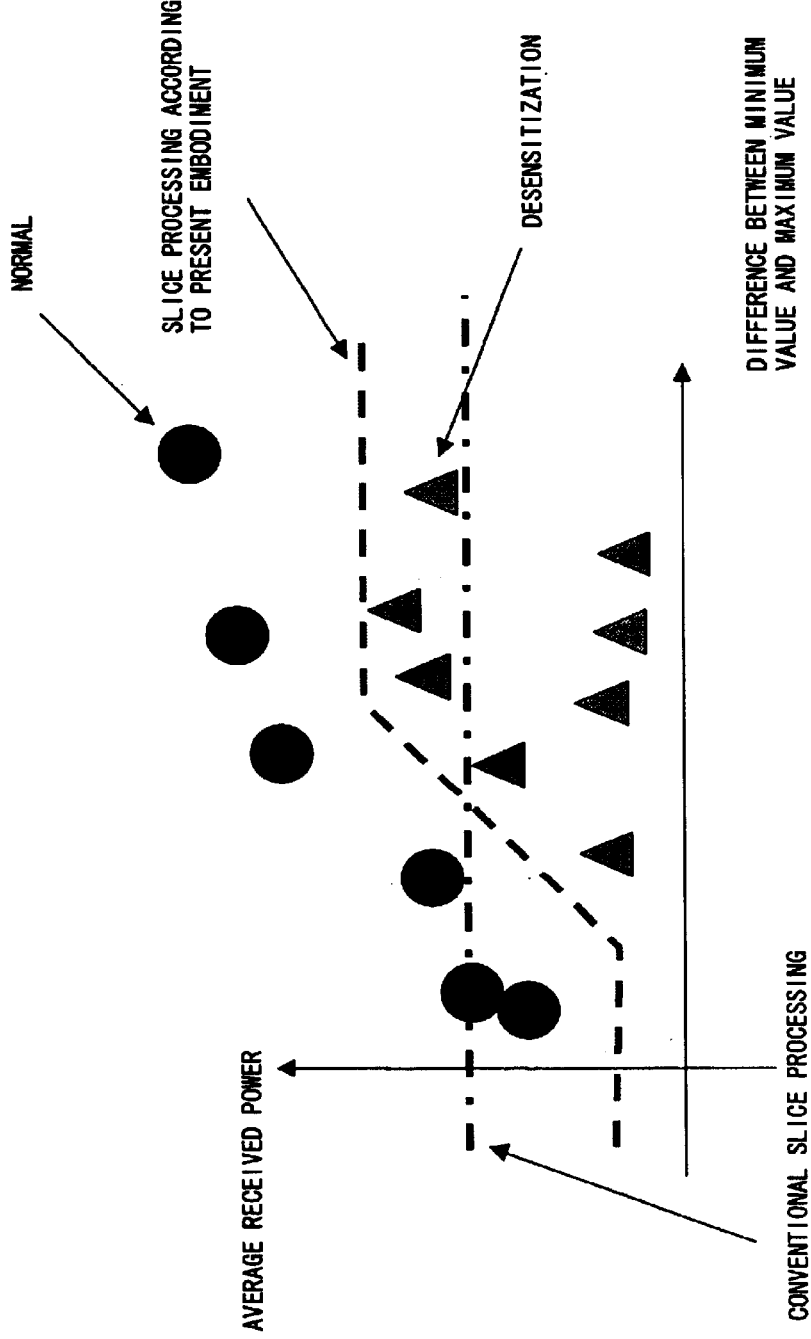
FIG. 16 shows the slice processing according to the first embodiment of the present invention.

FIGS. 15 and 16 are flowcharts of the signal processing according to the first embodiment of the present invention, and shows the slice processing according to the embodiment.

The processes are described below by referring to the flowcharts (1) The data of the Fourier transform (FFT (fast Fourier Transform) is used for a discrete Fourier transform) of a CW signal in each direction is read.
(2) The frequency range for peak detection is determined based on the velocity of the vehicle of the observer.

The following equation holds.

$$V = (c \cdot fd)/(2 \cdot f0)$$

where fd indicates the frequency change by a Doppler shift, V indicates the velocity of the vehicle of the observer, c indicates the velocity of light, and f0 indicates the carrier wave frequency f0. Therefore, when the velocity V of the vehicle of the observer is known by a velocity detection device, the frequency fd at which the frequency peak occurs by the Doppler shift can be substantially obtained by the equation.

(3) The peak power in the frequency range determined in (2) above is detected in each direction.

Since a radio radar unit loaded into a vehicle transmits radio waves in a plurality of discrete directions and receives reflected waves, the peak power is detected from the data in each direction.

Figure 1:
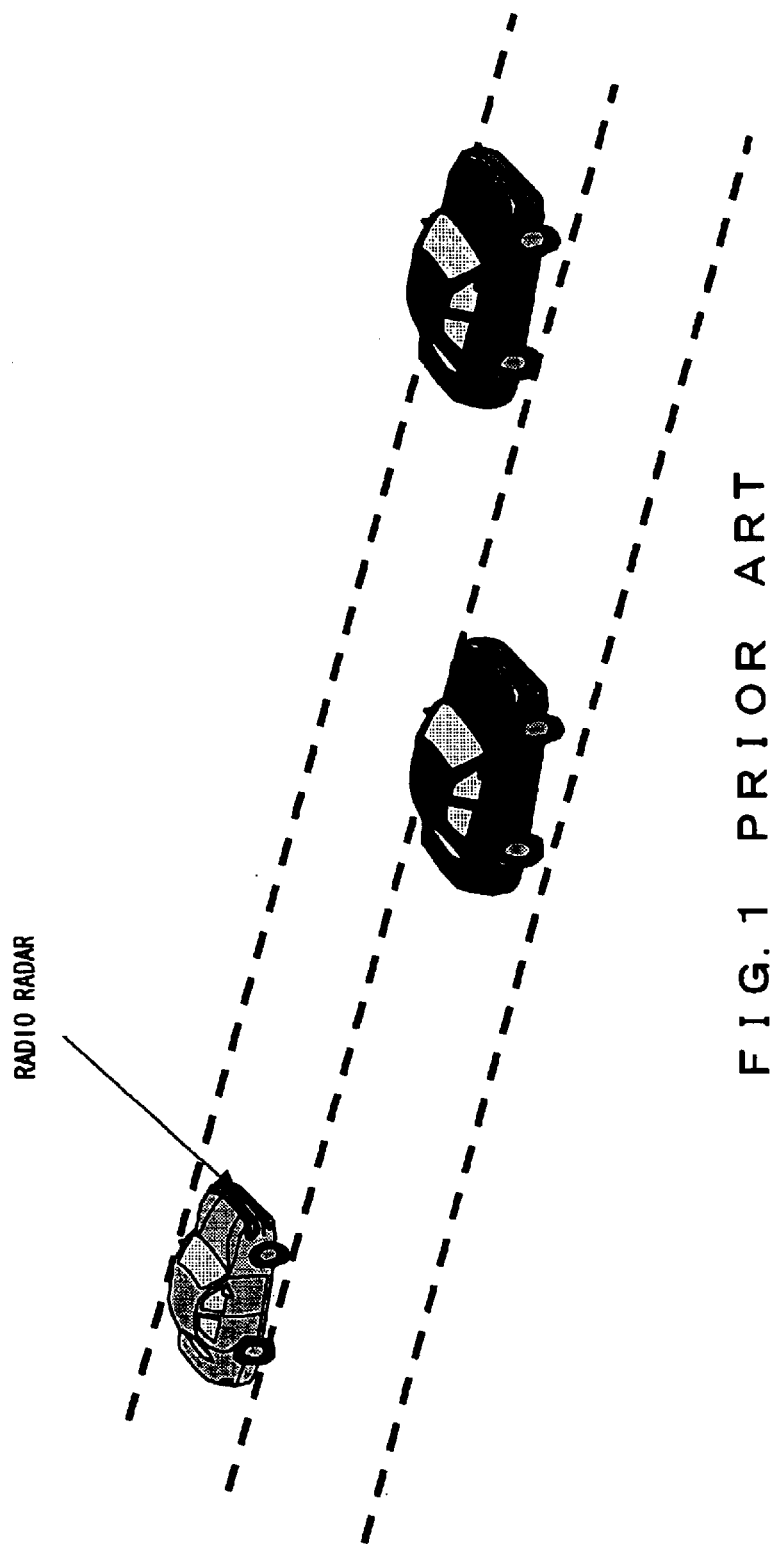
FIG. 1 shows an example of using radio radar.
Figure 2:
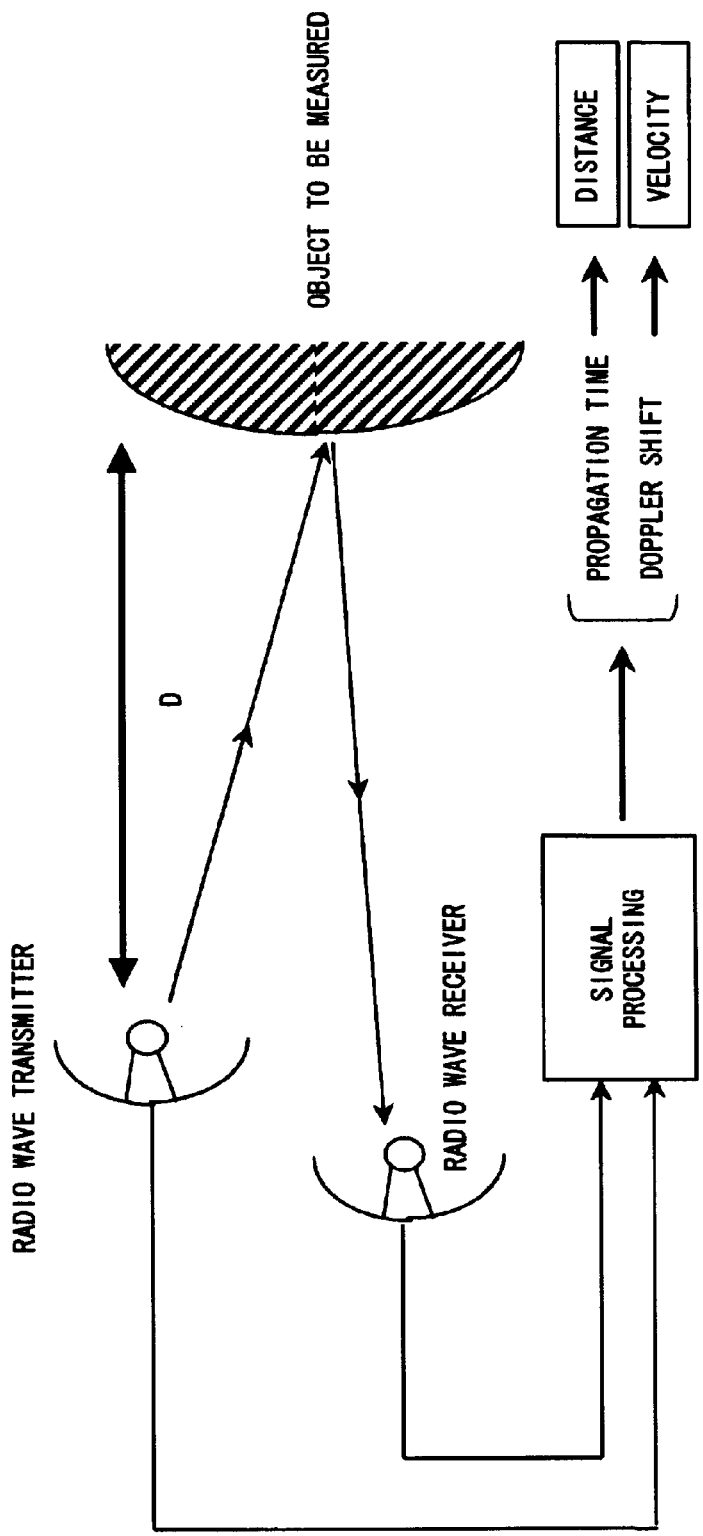
FIG. 2 shows the concept of radio radar.
Figure 3:
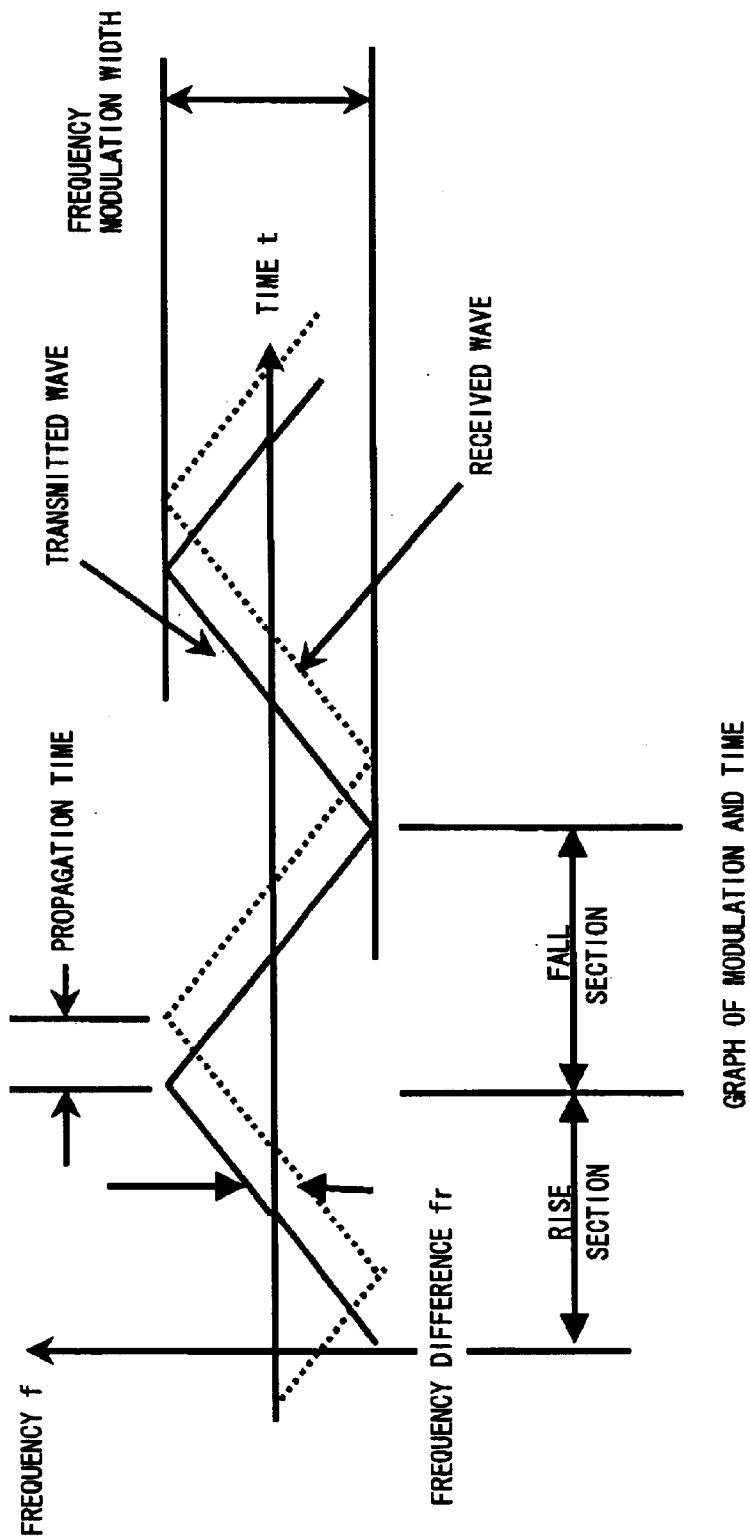
FIG. 3 is a view (1) showing the concept of the principle of the operation of radio radar, and the conventional problem.
Figure 4:
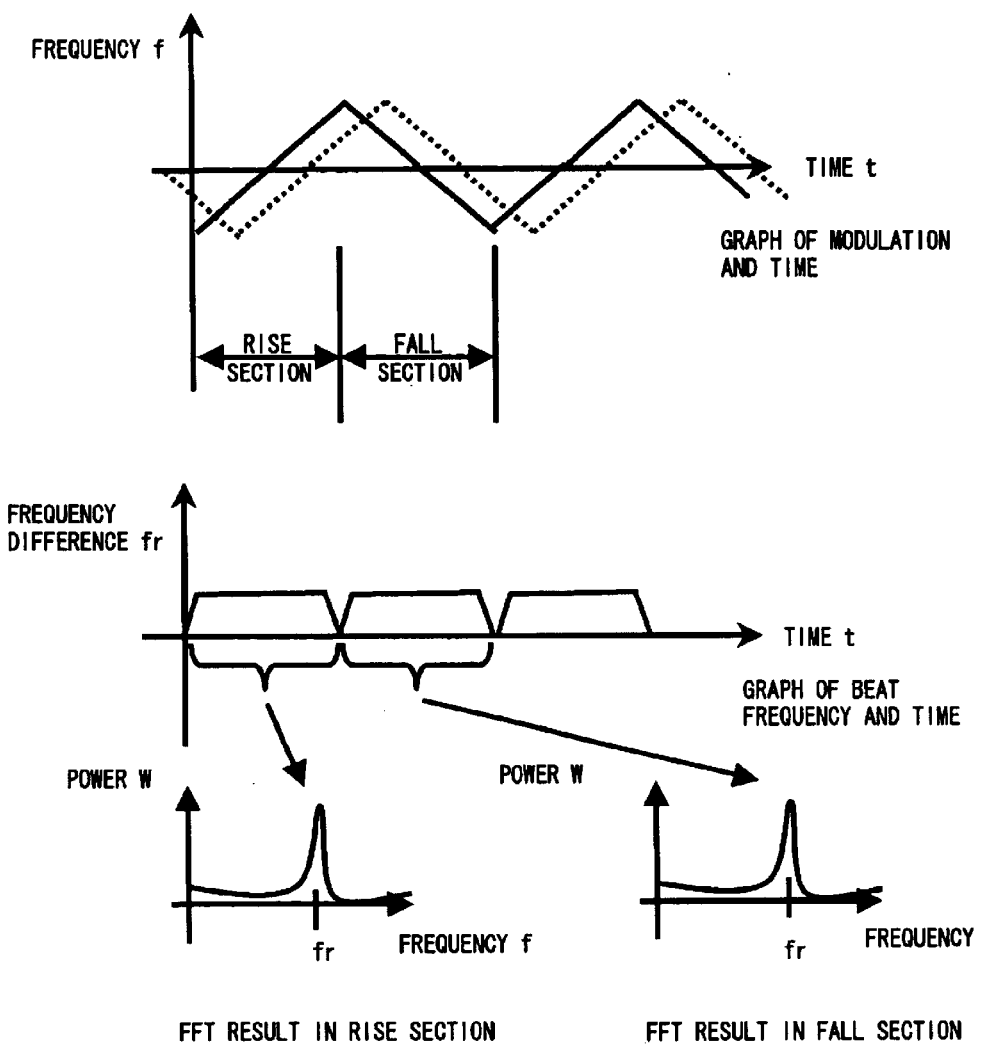
FIG. 4 is a view (2) showing the concept of the principle of the operation of radio radar, and the conventional problem.
Figure 5:
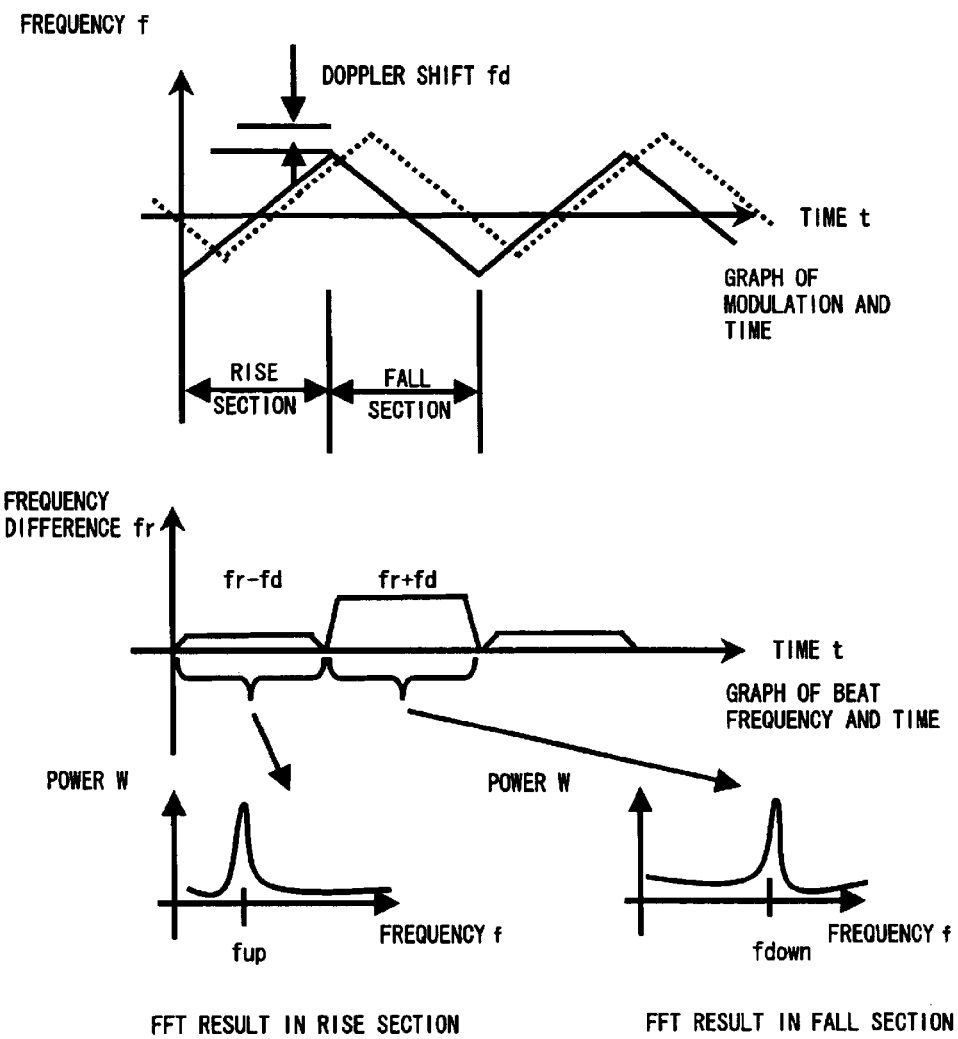
FIG. 5 is a view (3) showing the concept of the principle of the operation of radio radar, and the conventional problem.
Figure 6:
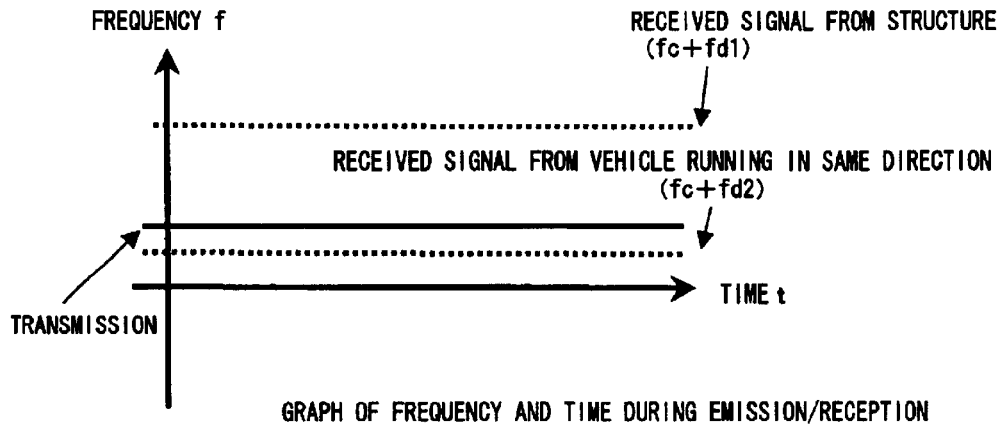
FIG. 6 is a view (4) showing the concept of the principle of the operation of radio radar, and the conventional problem.
Figure 6:
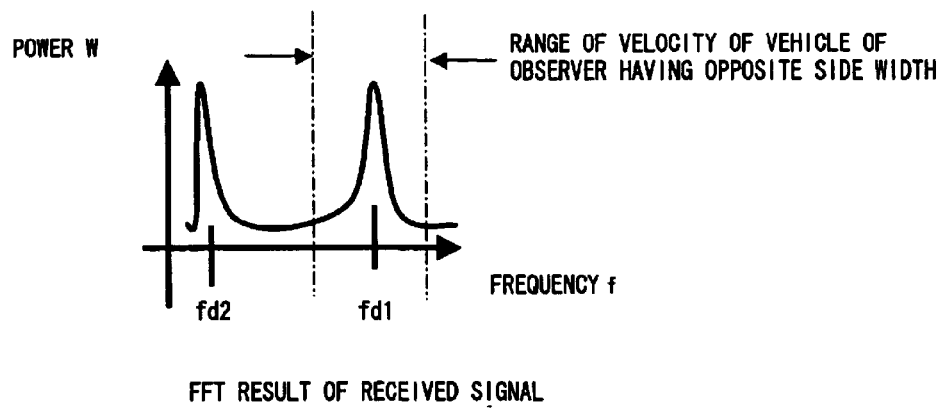
Figure 7:
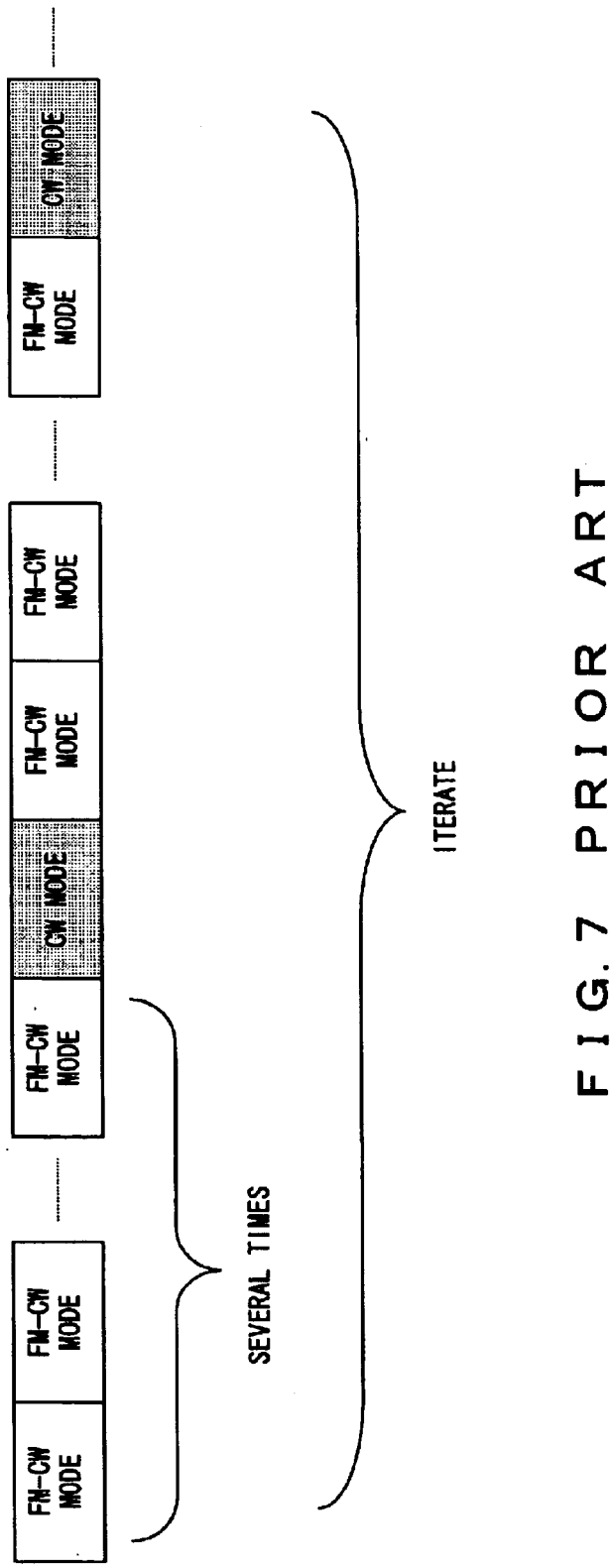
FIG. 7 is a view (5) showing the concept of the principle of the operation of radio radar, and the conventional problem.
Figure 8:
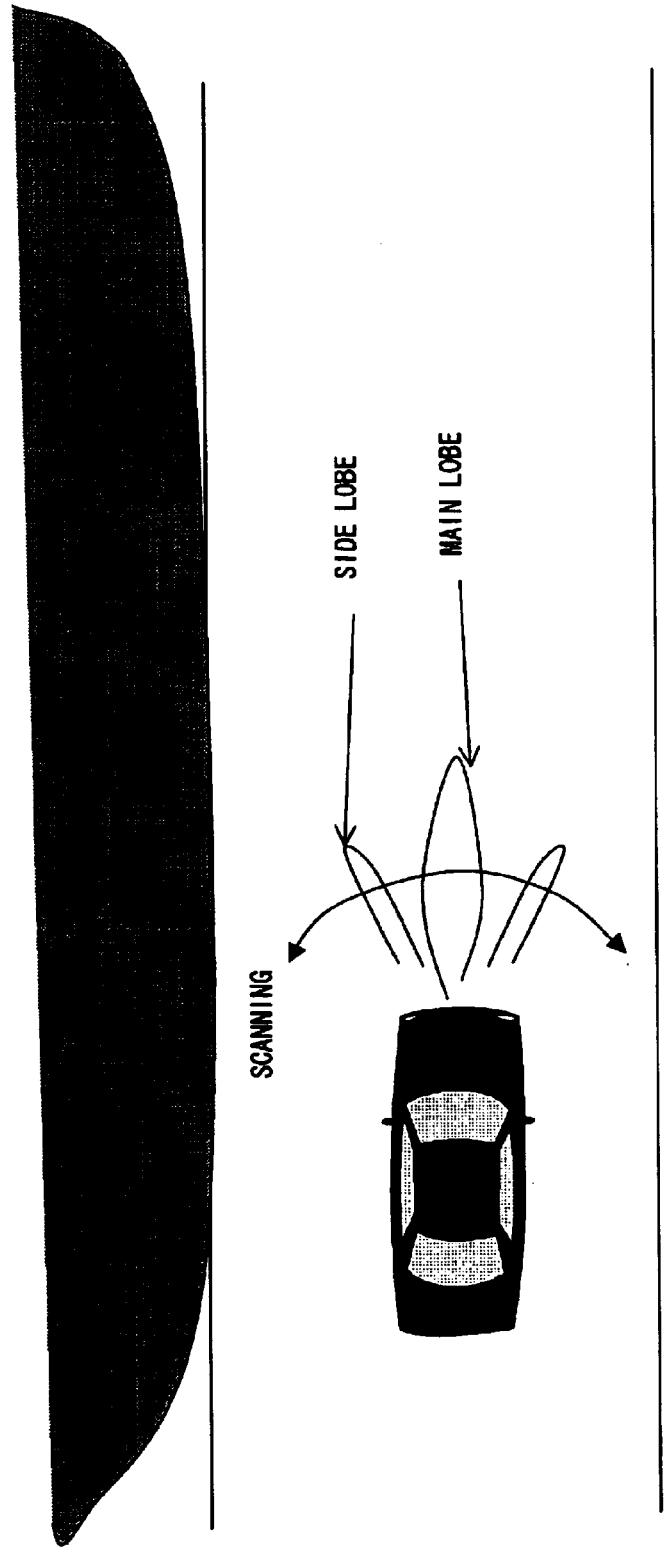
FIG. 8 is a view (6) showing the concept of the principle of the operation of radio radar, and the conventional problem.
Figure 9:
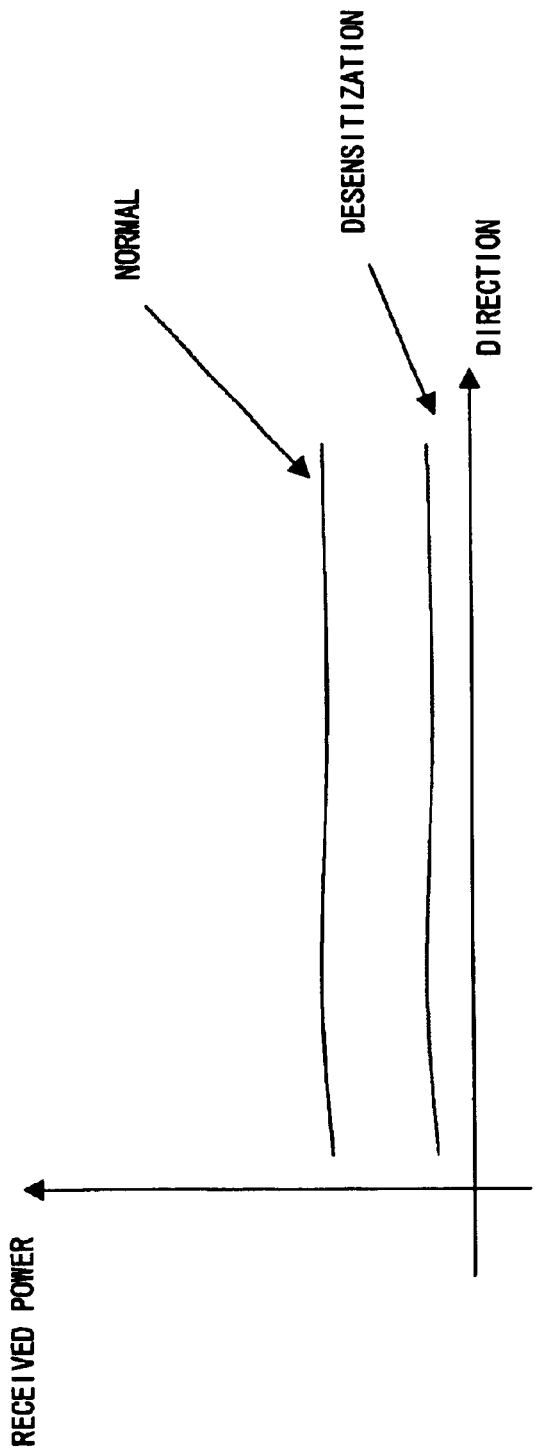
FIG. 9 is a view (7) showing the concept of the principle of the operation of radio radar, and the conventional problem.
Figure 10:
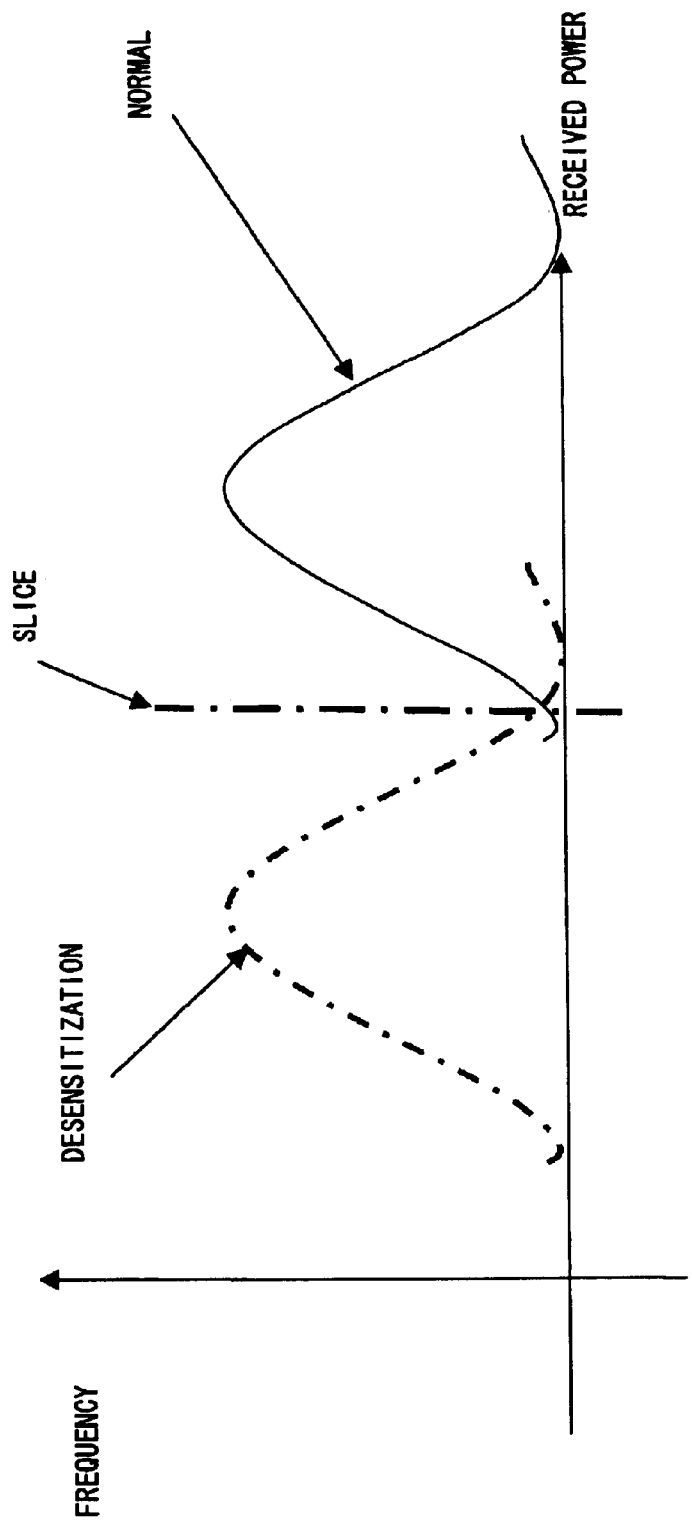
FIG. 10 is a view (8) showing the concept of the principle of the operation of radio radar, and the conventional problem.
Figure 11:
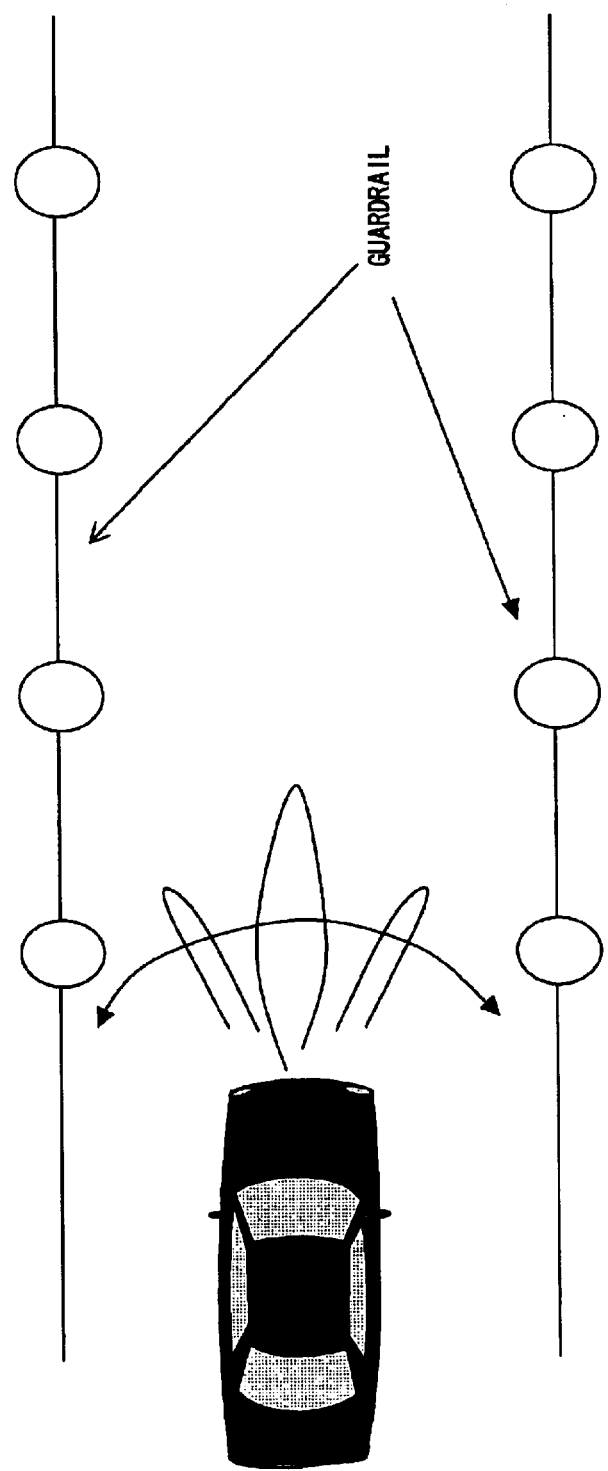
FIG. 11 is a view (9) showing the concept of the principle of the operation of radio radar, and the conventional problem.
Figure 12:
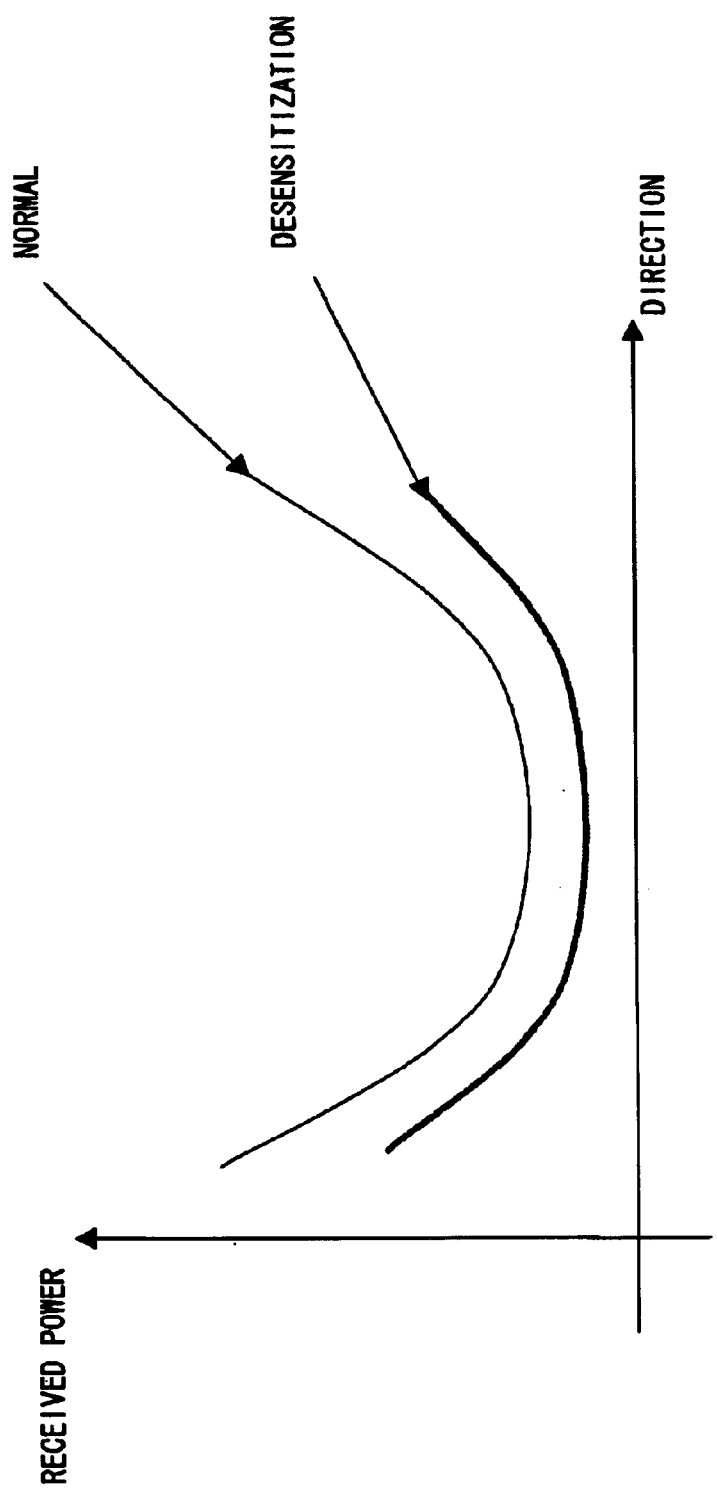
FIG. 12 is a view (10) showing the concept of the principle of the operation of radio radar, and the conventional problem.
Figure 13:
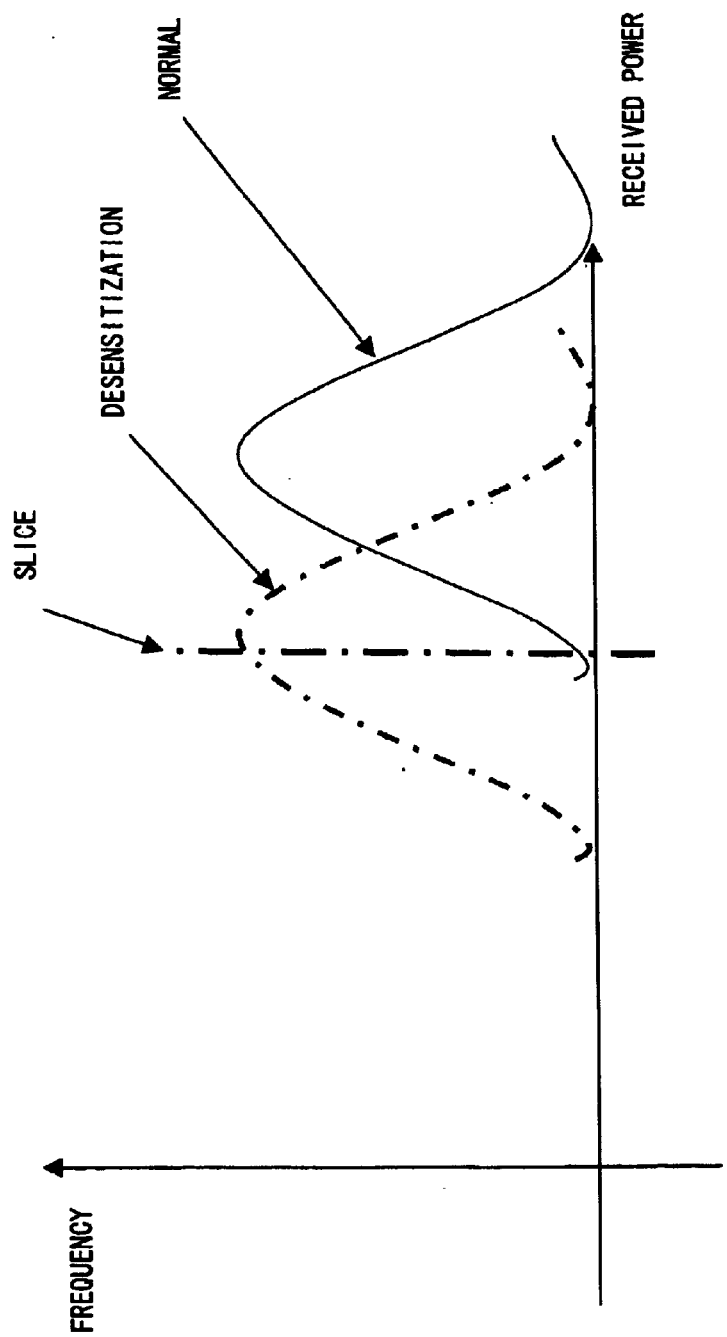
FIG. 13 is a view (11) showing the concept of the principle of the operation of radio radar, and the conventional problem.

(4) The peak power of each direction is accumulated a predetermined number of times, for example, five times.
(5) When the peak power is accumulated a plurality of number of times, an average value of the peak power is obtained for each direction.
(6) The entire average Av of the peak power is obtained.
(7) The maximum value MaxPower of the peak power in each direction obtained in (5) above is computed.
(8) The minimum value MinPower of the peak power in each direction obtained in (5) above is computed.
(9) The difference (Dv=MaxPower−MinPower) between the maximum and minimum values is computed.
(10) When there are no road structures, the difference (Dv) between directions is small as shown in FIG. 9, and the entire average (Av) is also small. When there are a number of road structures, the difference (Dv) between directions is large as shown in FIG. 12, and the entire average (Av) is also large. If the horizontal axis indicates the difference between the maximum and minimum values, the vertical axis indicates the entire average received power, and the normal data and the data of the desensitization are plotted, then the data are displayed as shown in FIG. 16. As it is apparent in FIG. 3, the desensitization cannot be always detected in the conventional method because only the slice processing is performed for the entire average in the conventional method. In the embodiment of the present invention, the slice processing is performed on the 2-dimensional plane of Av-Dv as shown in FIG. 16. At this time, the threshold used in the slice processing is not always constant with respect to Av or Dv, and is represented by the curve or the line graph in the Av-Dv plane as shown in FIG. 16.
(11) If it is determined that no desensitization is detected as a result of the slice processing in the 2-dimensional plane of Av-Dv as shown in FIG. 16, then a time series counter (realized by software provided in the CPU) is incremented. It holds the value of continuous occurrences of non-desensitization in a time series direction.
(12) The time series counter is treated in the slice processing. That is, it is determined whether or not the count value of the time series counter is equal to or larger than a predetermined value. If it is not continuously determined that the desensitization is detected, then the time series counter value increases with time, and no desensitization is detected in the slice processing in (12). If it is determined in the slice processing that the time series counter value has not reached a predetermined value, then control is returned to the step of reading FFT data.
(13) If it is determined that the time series counter value has reached a predetermined value, a desensitization diagram counter is reset. The desensitization diagram counter is realized by software in the CPU to count the continuous occurrences of desensitization.
(14) The time series counter is reset, and control is returned to the step of reading FFT data.
(15) If it is determined that desensitization is detected as a result of the slice processing in the 2-dimensional plane of Av-Dv as shown in FIG. 16, then the desensitization diagram counter is incremented by a predetermined value to check whether or not the desensitization continues.
(16) To determine whether or not desensitization is continuously determined, a variable referred to as a time series counter is provided and reset (set to 0).
(17) The slice processing is performed on the desensitization diagram counter. The peak received power data for a predetermined number of times is accumulated. If desensitization is detected, the desensitization diagram counter is incremented with time, and the slice processing detects it. If non-desensitization is detected in the slice processing, control is returned to the step of reading FFT data.
(18) The desensitization is detected, and is announced to the user and the control computer of a vehicle.

As described above, the desensitization can be more precisely detected by the 2-dimensional Av-Dv slice processing than in the conventional method.

Figure 17:
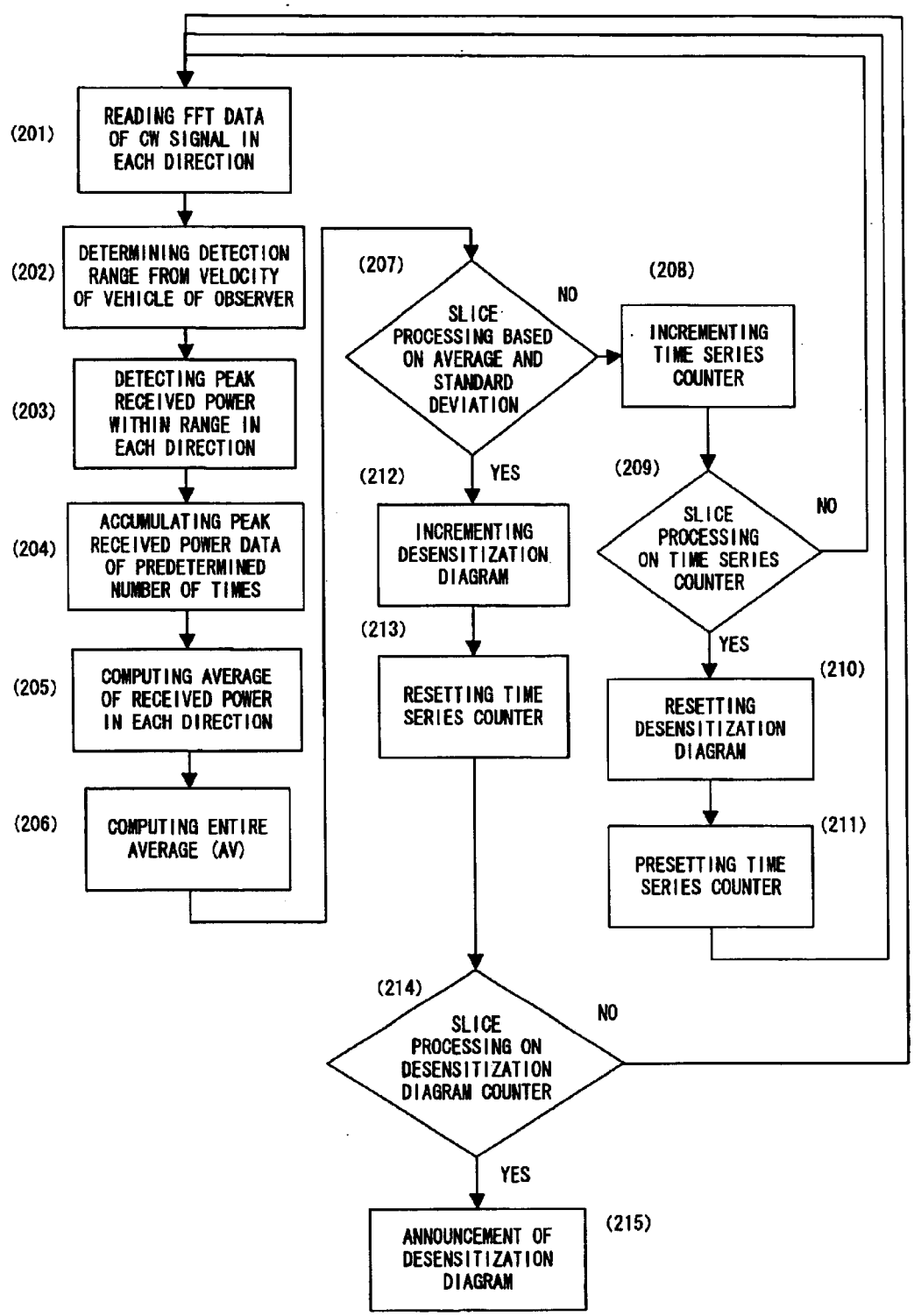
FIG. 17 is a view (1) showing the second embodiment of the present invention.
Figure 18:
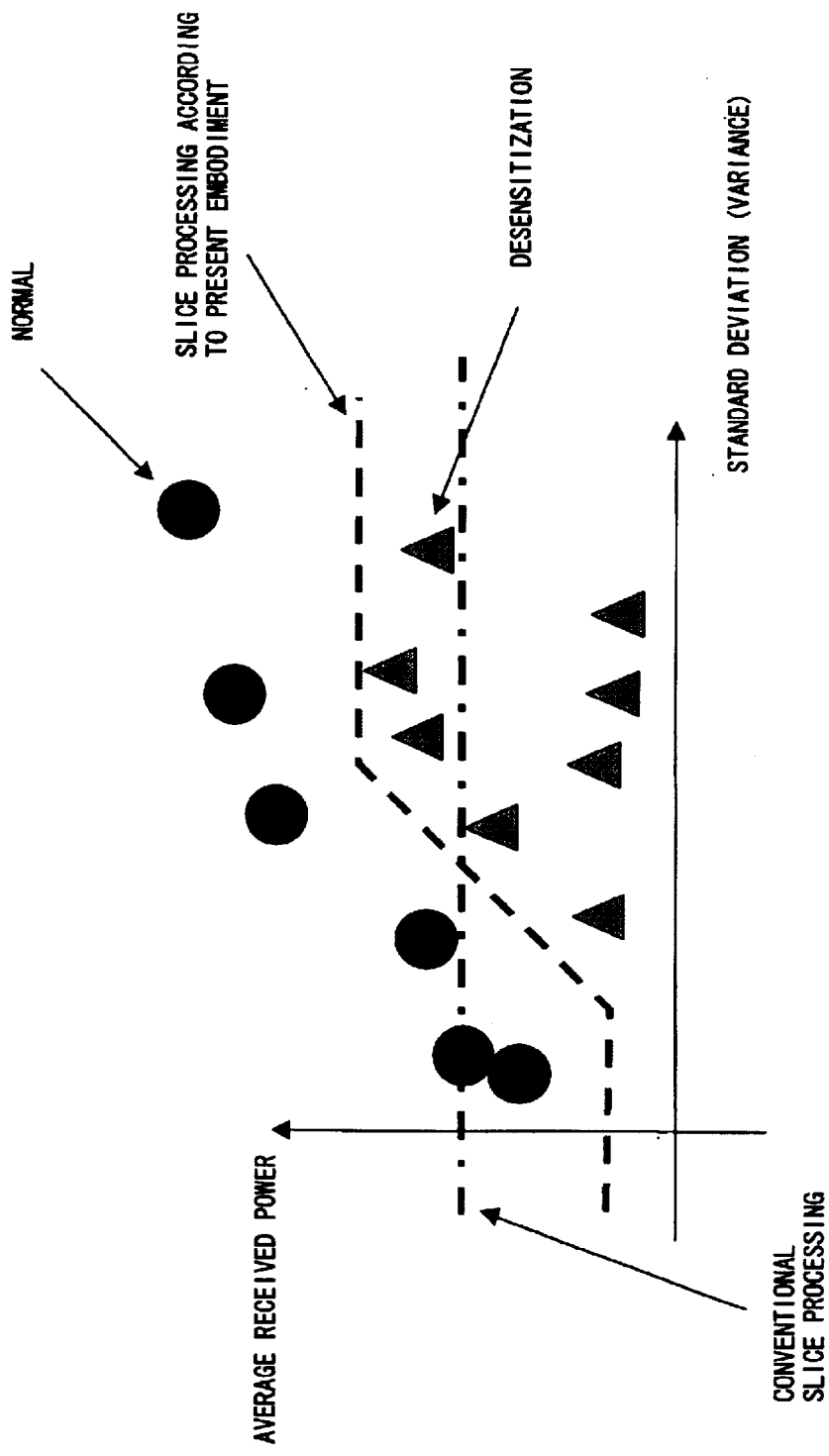
FIG. 18 is a view (2) showing the second embodiment of the present invention.

FIGS. 17 and 18 show the second embodiment of the present invention.

The process is described below by referring to the flowchart shown in FIG. 17.

(201) The data of the Fourier transform (FFT (fast Fourier Transform) is used for a discrete Fourier transform) of a CW signal in each direction is read.
(202) The frequency range for peak detection is determined based on the velocity of the vehicle of the observer.
(203) The peak power in the frequency range determined in (202) above is detected in each direction.
(204) The peak power of each direction is accumulated a predetermined number of times, for example, five times.
(205) The entire average Av of the peak power is obtained.
(206) A standard deviation or a variance is obtained using the peak received power data of a predetermined number of times in all directions.
(207) When there are no road structures, there is small distribution of data. Therefore, the standard deviation or the variance is small, and the entire average is also small. When there are a number of road structures, there is large distribution of data, and the entire average is also large. If the horizontal axis indicates the standard deviation and the vertical axis indicates the entire average received power, and normal data and the data of desensitization are plotted, then the result is expressed as shown in FIG. 18. The slice processing is performed based on the standard deviation or variance and the entire average in a 2-dimensional array as shown in FIG. 18.
(208) If it is determined that no desensitization is detected as a result of the slice processing in the 2-dimensional plane, then a time series counter (realized by software provided in the CPU) is incremented.
(209) The time series counter is treated in the slice processing. If the time series counter value has reached a predetermined value, control is passed to (210). Otherwise, control is returned to (201).
(210) If it is determined that the time series counter value has reached a predetermined value, a desensitization diagram counter is reset.
(211) The time series counter is reset, and control is returned to the step of reading FFT data.
(212) If it is determined that desensitization is detected as a result of the slice processing in the 2-dimensional plane, then a variable referred to as a desensitization diagram counter is incremented by a predetermined value to check whether or not the desensitization continues.
(213) To determine whether of not desensitization is continuously determined, a variable referred to as a time series counter is provided and reset (set to 0).
(214) The slice processing is performed on the desensitization diagram counter. If desensitization is detected, the desensitization diagram counter is incremented with time, and the slice processing detects it. If non-desensitization is detected in the slice processing, control is returned to the step of reading FFT data.
(215) When the desensitization is detected, it is announced to the user and the control computer of a vehicle.

In the slice processing using a standard deviation or a variance and an average, the desensitization can be more precisely detected than in the conventional method.

Figure 20:
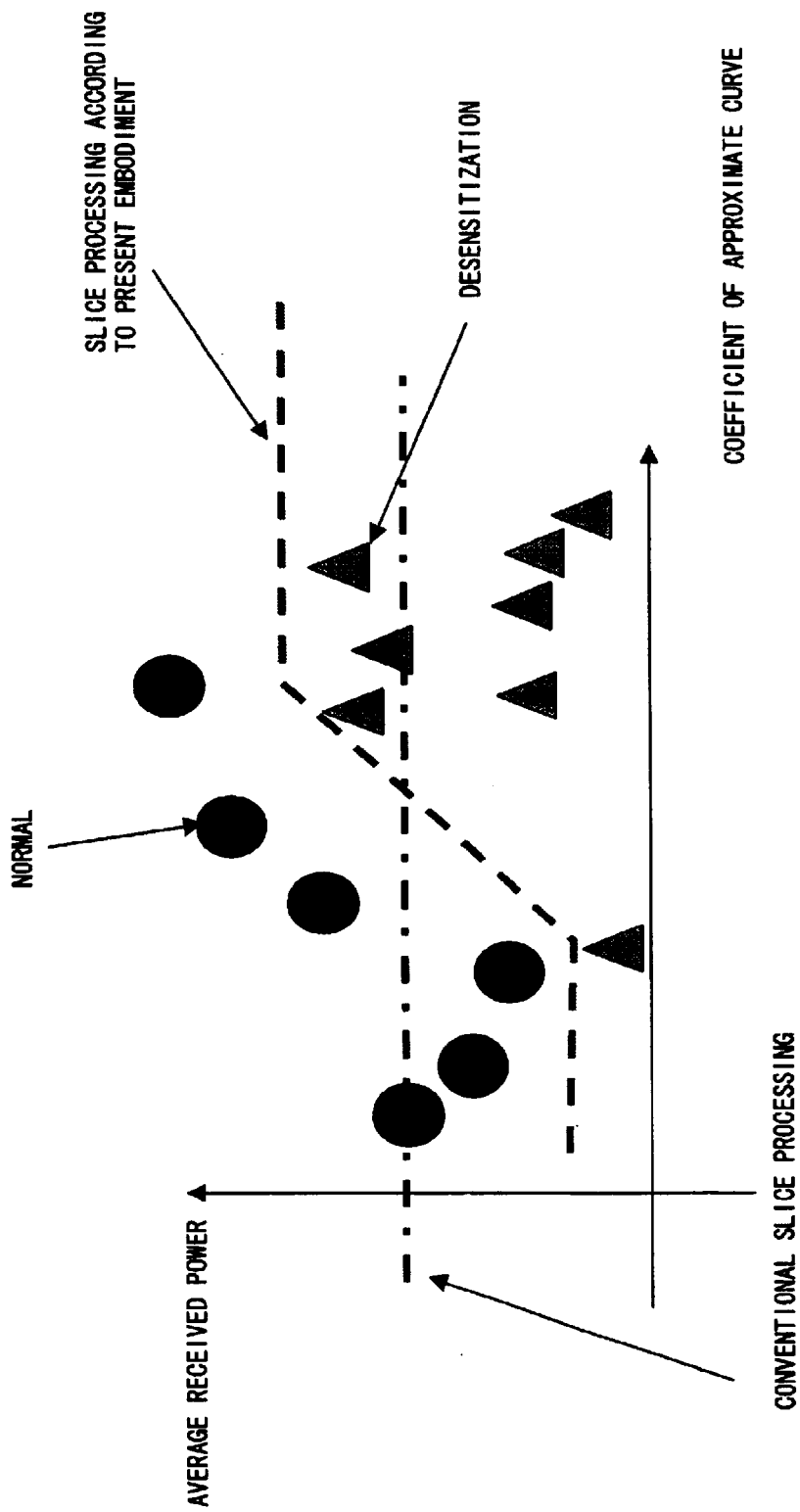
FIG. 20 is a view (2) showing the third embodiment of the present invention.

FIGS. 19 and 20 show the third embodiment of the present invention.

(301) The data of the Fourier transform (FFT (fast Fourier Transform) is used for a discrete Fourier transform) of a CW signal in each direction is read.
(302) The frequency range for peak detection is determined based on the velocity of the vehicle of the present apparatus.
(303) The peak power in the frequency range determined in (302) above is detected in each direction.
(304) The peak power of each direction is accumulated a predetermined number of times, for example, five times.
(305) When the peak power is accumulated a predetermined number of times, an average of peak power is obtained in each direction.
(306) The entire average Av of the peak power is obtained.
(307) Assume that the equation of an approximate curve is expressed by a quadratic ($y=ax^2+bx+c$) where x indicates a direction, and the approximate curve of the quadratic is obtained by, for example, least squares method.
(308) When there are no road structures, the difference in level of received power data is small between directions, and the coefficient a of the obtained approximate curve of the quadratic is small. The coefficient a is small and the entire average is also small. When there are a number of road structures, the difference in received power data is large between either end and the central portion of the road. Therefore, the coefficient a of the quadratic approximate curve is large, and the entire average is also large. If the horizontal axis indicates the coefficient a and the vertical axis indicates the entire average received power, and normal data and the data of desensitization are plotted, then the result is expressed as shown in FIG. 20. The slice processing is performed based on the coefficient a of the quadratic approximate curve and the entire average in a 2-dimensional array as shown in FIG. 20.
(309) If it is determined that no desensitization is detected as a result of the slice processing in the 2-dimensional plane, then a time series counter (realized by software provided in the CPU) is incremented.
(310) The time series counter is treated in the slice processing.
(311) If it is determined that the time series counter value has reached a predetermined value, the desensitization diagram counter is reset.
(312) The time series counter is reset and the process returns to reading of FFT data.
(313) If it is determined that desensitization is detected as a result of the slice processing in the 2-dimensional plane, then the desensitization diagram counter is incremented by a predetermined value to check whether or not the desensitization continues.
(314) To determine whether of not desensitization is continuously determined, a variable of a time series counter is provided and reset (set to 0).
(315) The slice processing is performed on the desensitization diagram counter. If desensitization is detected, the desensitization diagram counter is incremented with time, and the slice processing detects it. If non-desensitization is detected in the slice processing, control is returned to the step of reading FFT data.
(316) When the desensitization is detected, it is announced to the user and the control computer of a vehicle.

In the slice processing using a coefficient of an approximate curve and an average, the desensitization can be more precisely detected than in the conventional method.

Figure 21:
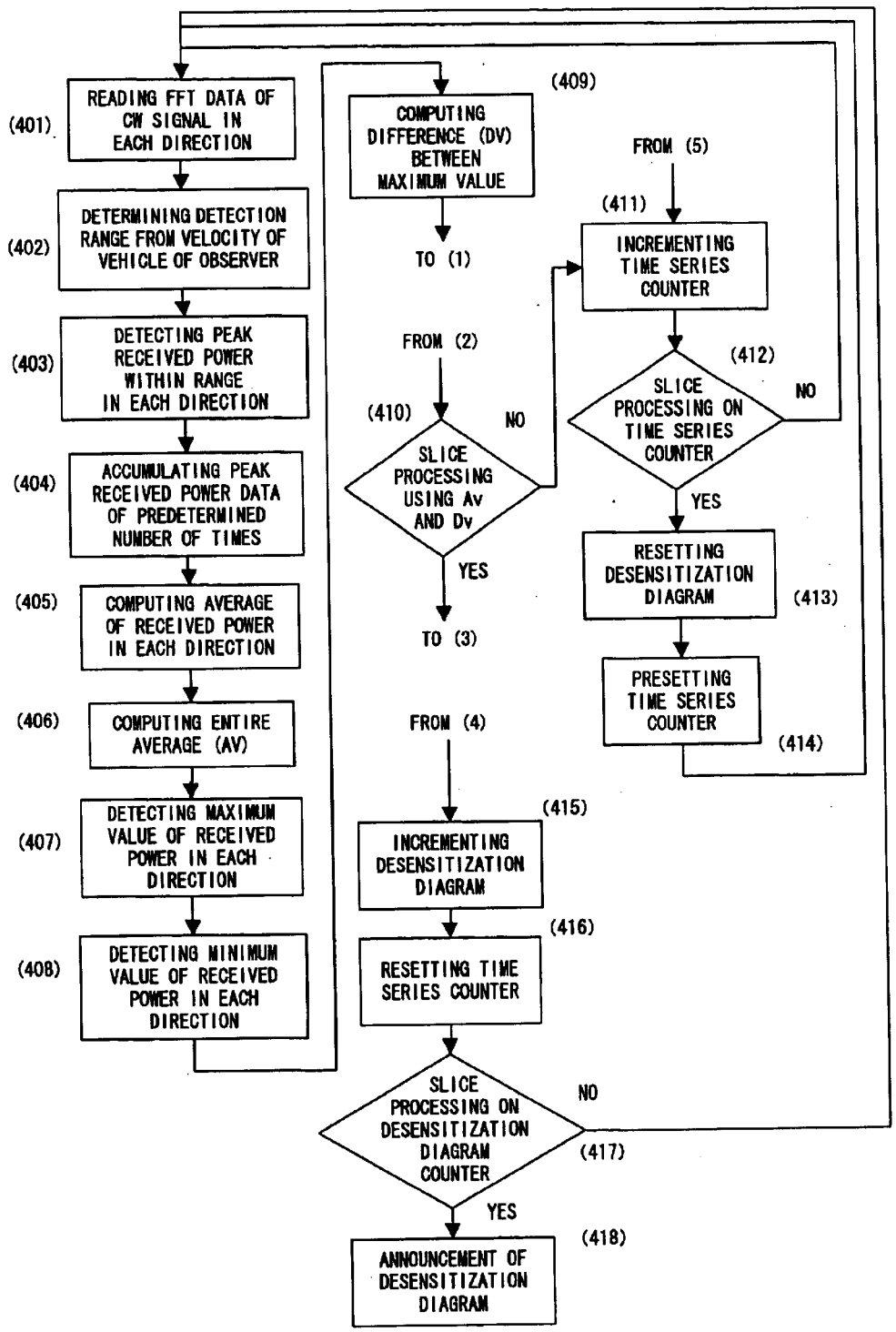
FIG. 21 is a view (1) showing the fourth embodiment of the present invention.
Figure 25:
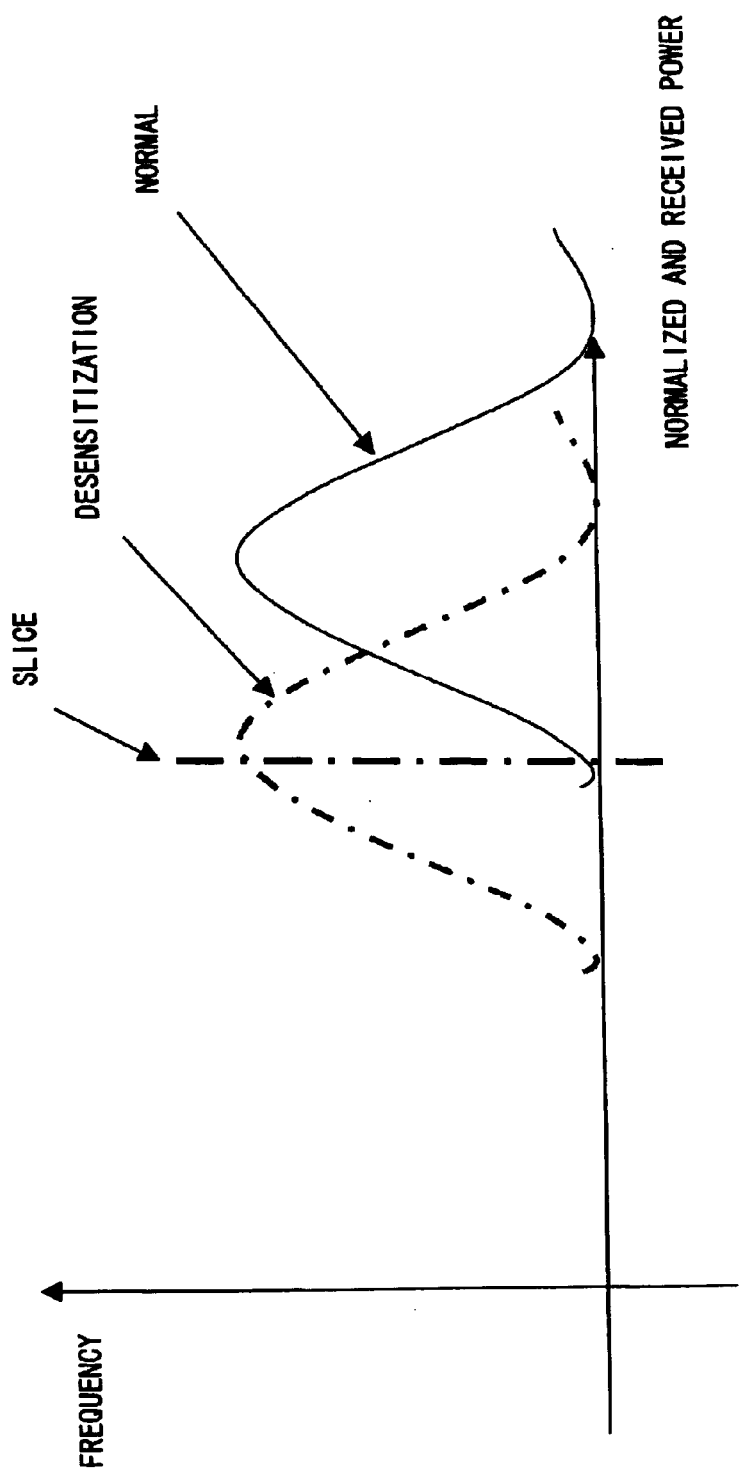
FIG. 25 is a view (5) showing the fourth embodiment of the present invention.

FIGS. 21 and 25 show the fourth embodiment of the present invention.

According to the present embodiment, not only CW radar data, but also FM-CW radar data are used, thereby avoiding erroneous detection of desensitization by failing in obtaining the reflection from the road, etc. in the CW mode, etc. when a beam of radar travels in the sky because the vehicle runs on the up grade.

First, the process shown in FIG. 21 is described below.

(401) The data of the Fourier transform (FFT (fast Fourier Transform) is used for a discrete Fourier transform) of a CW signal in each direction is read.
(402) The frequency range for peak detection is determined based on the velocity of the vehicle of the present apparatus.
(403) The peak power in the frequency range determined in (402) above is detected in each direction.
(404) The peak power of each direction is accumulated a predetermined number of times, for example, five times.
(405) When the peak power is accumulated a predetermined number of times, an average of peak power is obtained in each direction.
(406) The entire average Av of the peak power is obtained.
(407) The maximum value MaxPower of the peak power in each direction is computed.
(408) The minimum value MinPower of the peak power in each direction is computed.
(409) The difference (Dv=MaxPower−MinPower) between the maximum and minimum values is computed. Then, the processes in and after the process in (419) are performed using the FM-CW data.
(410) After processing (424) the FM-CW data, the slice processing is performed in the Av-Dv 2-dimensional plane. Then, the processes after the slice processing (425) using the FM-CW data are performed.
(411) If it is determined that no desensitization is detected as a result of the slice processing in the 2-dimensional plane of Av-Dv, then a time series counter (realized by software provided in the CPU) is incremented. If the result of the slice processing (426) is NO, control is passed to (411).
(412) The time series counter is treated in the slice processing. If the time series counter value has not reached a predetermined value, control is passed to (401).
(413) If it is determined that the time series counter value has reached a predetermined value, a desensitization diagram counter is reset.
(414) The time series counter is reset, and control is returned to the step of reading FFT data.
(415) If desensitization is determined after the slice processing in a two-dimension after the slice processing on the FM-CW data, then the desensitization diagram counter is incremented by a predetermined value to check whether or not the desensitization continues.
(416) To determine whether or not desensitization is continuously determined, a variable referred to as a time series counter is provided and reset (set to 0).
(417) The slice processing is performed on the desensitization diagram counter. If desensitization is detected, the desensitization diagram counter is incremented with time, and the slice processing detects it. If non-desensitization is detected in the slice processing, control is returned to the step of reading FFT data.
(418) The desensitization is detected, and is announced to the user and the control computer of a vehicle.

The processes are almost the same as in the first embodiment.

Figure 22:
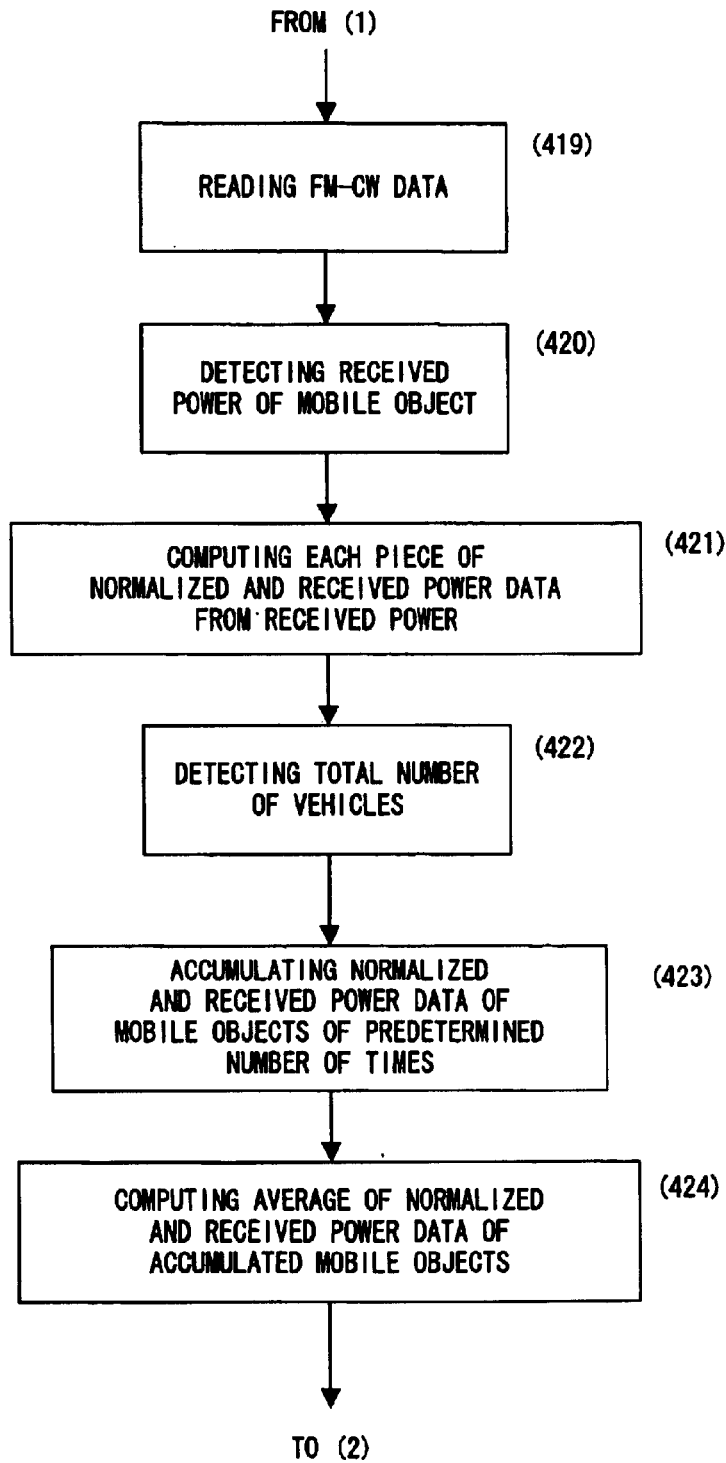
FIG. 22 is a view (2) showing the fourth embodiment of the present invention.

The process shown in FIG. 22 is described below.

Figure 24:
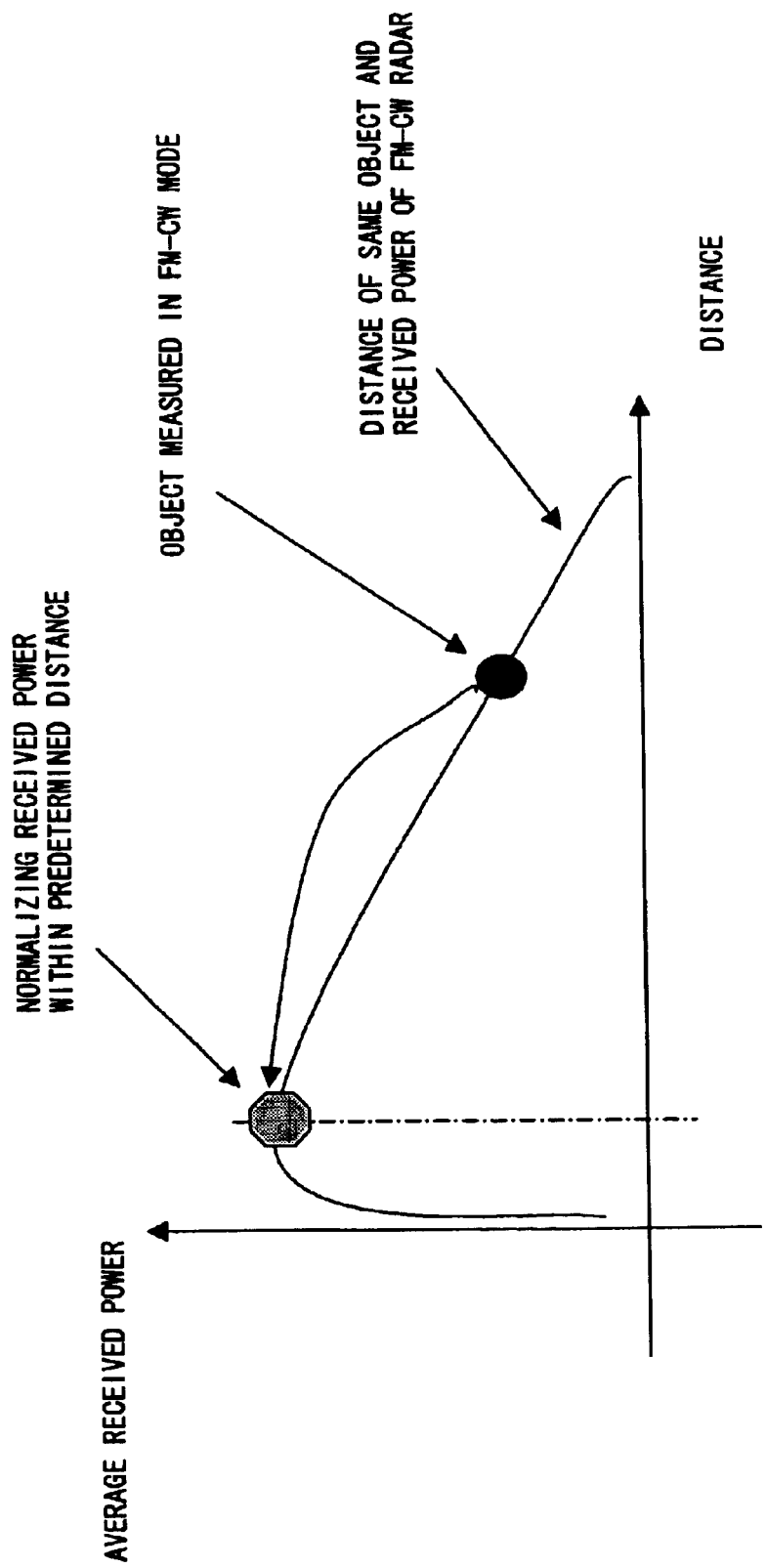
FIG. 24 is a view (4) showing the fourth embodiment of the present invention.

(419) The FM-CW mode data is read.
(420) The data determined as a non-road-structure (traveling object) is detected, and the maximum received power is read.
(421) As shown in FIG. 24, the received power is inversely proportional to a biquadrate of a distance. FIG. 17 shows a case in which the received power is represented by a logarithm. To simplify the subsequent processes, the received power obtained as described above is converted into the received power at a predetermined distance and time. This process is referred to as normalization of received power.
(422) The FM-CW mode is more frequently entered than the CW mode. For example, while the radar scanning operation is performed five times, the FM-CW mode is entered four times, and the CW mode is entered once. If the CW data is accumulated five times as in (4) above in the first embodiment, the scanning operation is performed 20 times in the FM-CW mode to detect data. Therefore, the total number of vehicles in the 20 operations or the total number of vehicles in the 4 operations before obtaining an average is obtained in real time.
(423) The above-mentioned normalized received power is accumulated the number of predetermined times for obtaining the average of the CW data.
(424) An average of the normalized received power of accumulated mobile objects is computed.

Figure 23:
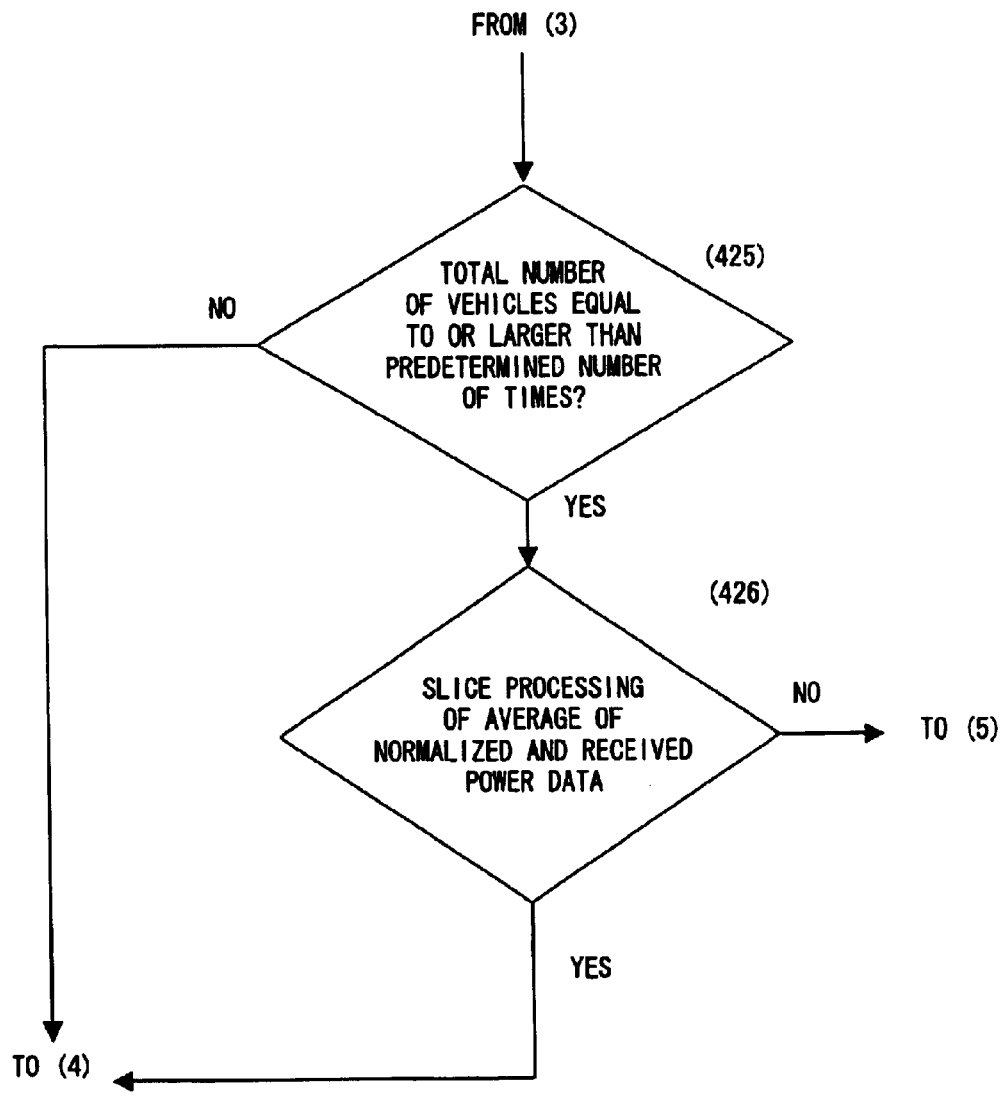
FIG. 23 is a view (3) showing the fourth embodiment of the present invention.

The processes shown in FIG. 23 are described below.

(425) The slice processing is performed based on the total number of vehicles obtained in (422) above. If the total number of vehicles is equal to or smaller than a predetermined value, control is passed to (415). If the total number of vehicles is equal to or larger than the predetermined value, then control is passed to (426). When the total number of vehicles is small in the operation performed, for example, 20 times, obtained data is not reliable.
(426) The slice processing is performed on an average of normalized received power. FIG. 25 shows the histogram of the average. The center of the distribution differs between a normal case and a desensitized case. Therefore, the slice processing enables the normal and desensitized cases. When it is determined that data indicates a normal case, control is passed to the process in (411). When it is determined that data indicates desensitization, control is passed to the process in (415).

Using data of FM-CW radar in addition to data of CW radar, the desensitization can be more precisely detected than in the conventional method.

Figure 26:
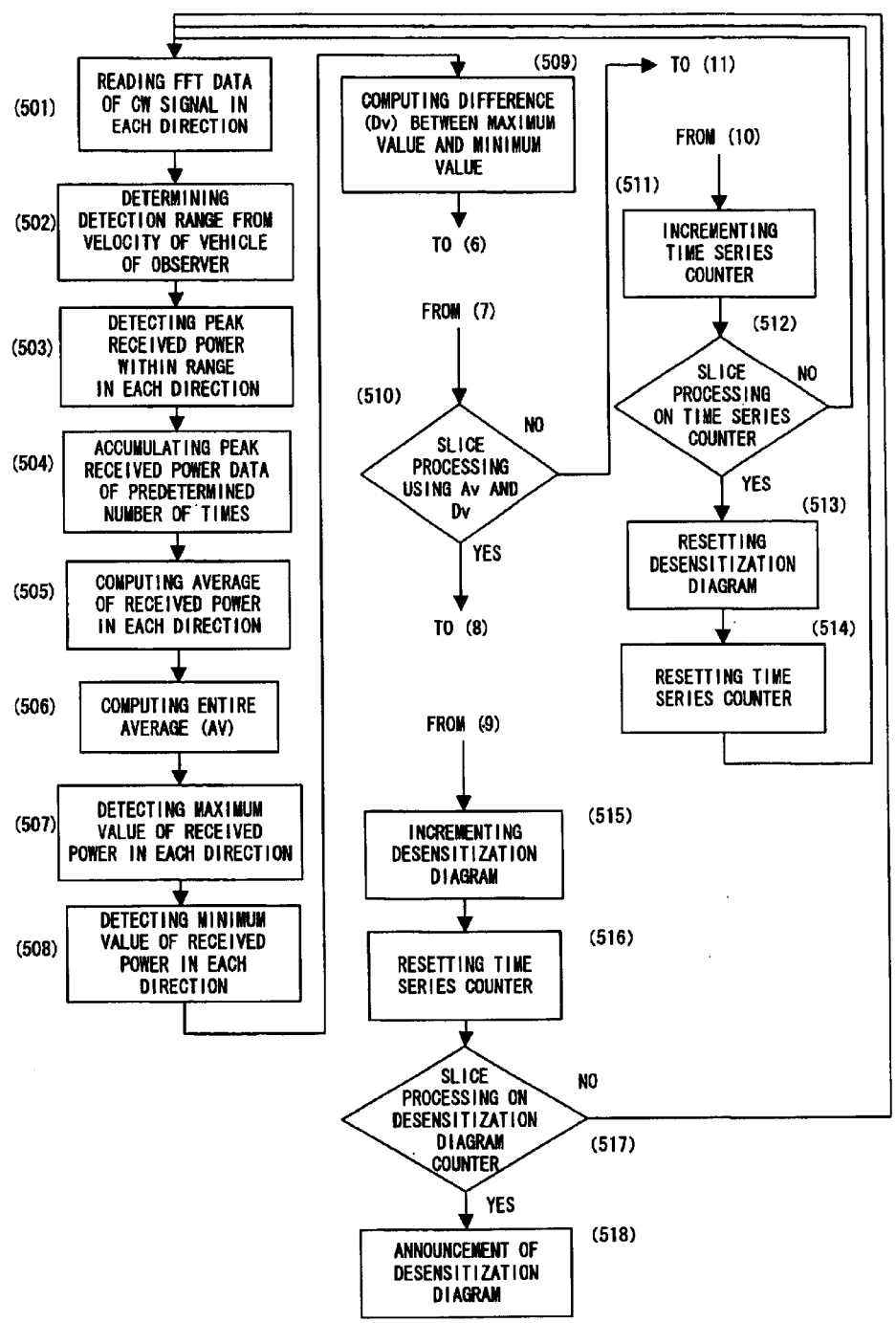
FIG. 26 is a view (1) showing the fifth embodiment of the present invention.
Figure 27:
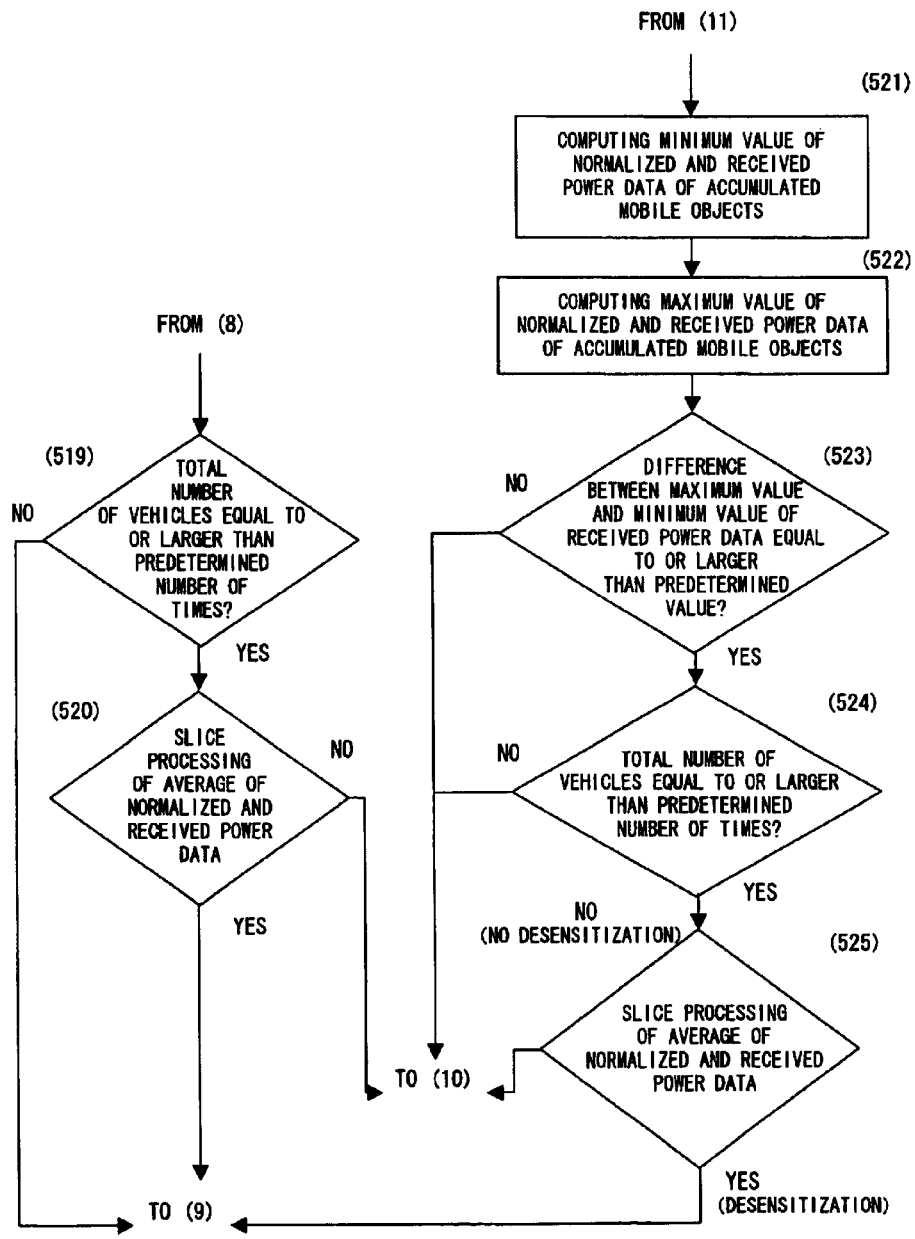
FIG. 27 is a view (2) showing the fifth embodiment of the present invention.
Figure 28:
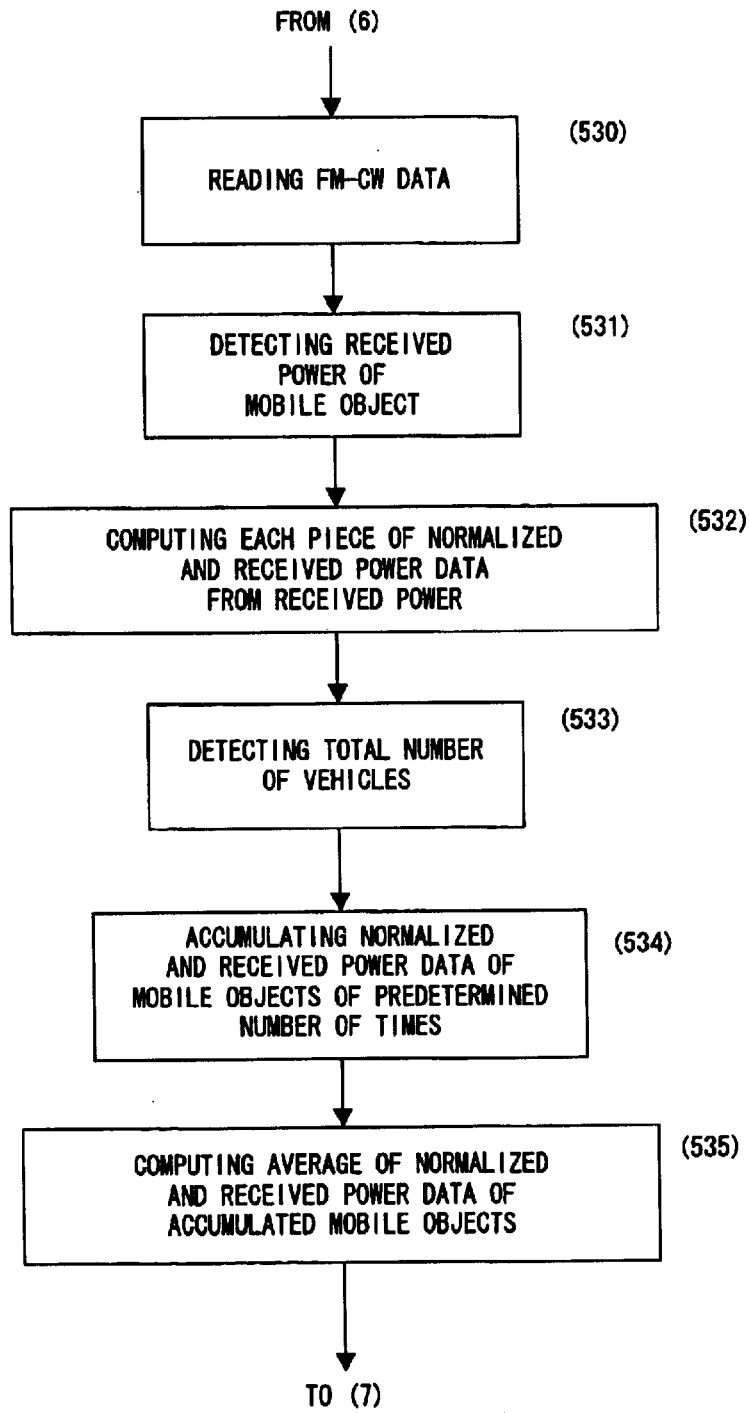
FIG. 28 is a view (3) showing the fifth embodiment of the present invention.
Figure 29:
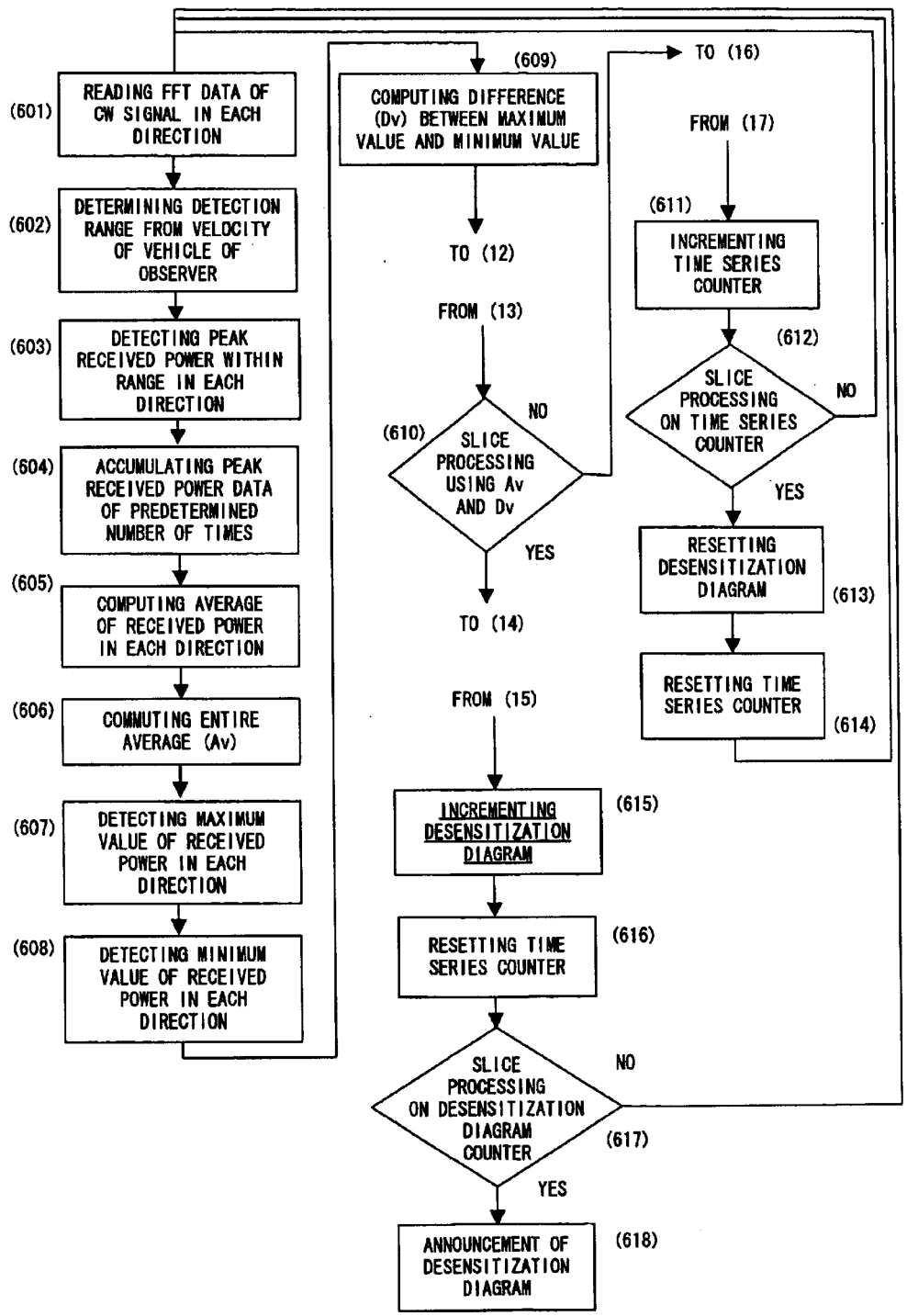
FIG. 29 is a view (1) showing the sixth embodiment of the present invention.

FIGS. 26 through 28 show the fifth embodiment of the present invention.

In the fourth embodiment, determination is made using CW data, and then the result is confirmed using FM-CW data. In the present embodiment, the desensitization is detected using the FM-CW data. Thus, the desensitization which cannot be detected in the CW mode due to a large number of road structures can be detected without fail.

Described below are the processes shown in and after FIG. 26.

(501) The data of the Fourier transform (FFT (fast Fourier Transform) is used for a discrete Fourier transform) of a CW signal in each direction is read.
(502) The frequency range for peak detection is determined based on the velocity of the vehicle of the observer.
(503) The peak power in the frequency range determined in (502) above is detected in each direction.
(504) The peak power of each direction is accumulated a predetermined number of times, for example, five times.
(505) When the peak power is accumulated a predetermined number of times, an average of peak power is obtained in each direction.

(506) The entire average Av of the peak power is obtained.

(507) The maximum value MaxPower of the peak power in each direction is computed.

(508) The minimum value MinPower of the peak power in each direction is computed.

(509) The difference (Dv=MaxPower−MinPower) between the maximum and minimum values is computed. Then, the processes in and after the process in (525) are performed using the FM-CW data.

(510) After processing (530) the FM-CW data, the slice processing is performed in the Av-Dv 2-dimensional plane. If it is determined that desensitization has been detected after the Av-Dv 2-dimensional slice processing is performed, then the processes after the slice processing (519) using the FM-CW data are performed. If it is determined that a normal sensitivity has been detected, control is passed to the process in (521).

(511) If it is determined that no desensitization is detected as a result of the slice processing in the 2-dimensional plane of Av-Dv, then a time series counter (realized by software provided in the CPU) is incremented. There can be a case in which control is returned to the process in (511) from the slice processing (520), the slice processing (523), and the slice processing (524).

(512) The time series counter is treated in the slice processing. If the time series counter value has not reached a predetermined value, control is passed to (501).

(513) If it is determined that the time series counter value has reached a predetermined value, a desensitization diagram counter is reset.

(514) The time series counter is reset, and control is returned to the step of reading FFT data.

(515) If desensitization is determined after the slice processing in a two-dimension after the slice processing on the FM-CW data, then the desensitization diagram counter is incremented by a predetermined value to check whether or not the desensitization continues.

(516) To determine whether of not desensitization is continuously determined, a variable referred to as a time series counter is provided and reset (set to 0).

(517) The slice processing is performed on the desensitization diagram counter. If desensitization is detected, the desensitization diagram counter is incremented with time, and the slice processing detects it. If non-desensitization is detected in the slice processing, control is returned to the step of reading FFT data.

(518) When the desensitization is detected, it is announced to the user and the control computer of a vehicle.

The processes are almost the same as in the first embodiment.

The process shown in FIG. 27 is described below.

(519) The slice processing is performed based on the total number of vehicles. If the total number of vehicles is equal to or smaller than a predetermined value, control is passed to (515). If the total number of vehicles is equal to or larger than the predetermined value, then control is passed to (520). When the total number of vehicles is small in the operation that is performed, for example, 20 times, obtained data is not reliable.

(520) The slice processing is performed on an average of normalized received power. The center of the distribution differs between a normal case and a desensitized case. Therefore, the slice processing enables the normal and desensitized cases. When it is determined that data indicates a normal case, control is passed to the process in (511). When it is determined that data indicates desensitization, control is passed to the process in (515).

(521) The minimum value of the normalized received power data of accumulated mobile objects is detected.

(522) The maximum value of the normalized received power data of accumulated mobile objects is detected.

(523) The slice processing is performed on the difference between the maximum and minimum values. This process is performed to easily check the presence of a plurality of vehicles in the FM-CW data obtained as a result of performing the scanning operation several times. If the obtained value is equal to or larger than a predetermined value, then control is passed to (524). If it is smaller than the predetermined value, then control is passed to (511).

(524) The slice processing is performed based on the total number of vehicles. If the total number of vehicles is equal to or smaller than a predetermined value, control is passed to (511). If the total number of vehicles is equal to or larger than the predetermined value, then control is passed to (525). When the total number of vehicles is small in the operation that is performed, for example, 20 times, obtained data is not reliable.

(525) The slice processing is performed on an average of normalized received power. The center of the distribution differs between a normal case and a desensitized case. Therefore, the slice processing enables the normal and desensitized cases. When it is determined that data indicates a normal case, control is passed to the process in (511). When it is determined that data indicates desensitization, control is passed to the process in (515). However, it is not necessary that the obtained value is equal to the slice value obtained in the process in (520).

Described below is the process shown in FIG. 28.

The process is performed prior to (510) after performing the process in (509) shown in FIG. 26.

(530) The data of the FM-CW radar is read.

(531) The received power of a mobile object is detected.

(532) The normalized received power is computed from the received power.

(533) The total number of mobile objects in the possible range of the FM-CW radar is detected.

(534) The normalized received power data of the mobile objects is accumulated a predetermined number of times.

(535) An average of the normalized received power data of accumulated mobile objects is computed. Then, control is passed to (510) shown in FIG. 26.

Since the desensitization is detected using FM-CW data, the desensitization can be more precisely detected than in the conventional method.

FIGS. 29 through 32 show the sixth embodiment of the present invention.

In the sixth embodiment, the increment value of the desensitization counter is changed by the value of the received power of the FM-CW radar, thereby more quickly making determination.

(601) The data of the Fourier transform (FFT (fast Fourier Transform) of a CW signal in each direction is read.

(602) The frequency range for peak detection is determined based on the velocity of the vehicle of the present apparatus.

(603) The peak power in the frequency range determined in (602) above is detected in each direction.

(604) The peak power of each direction is accumulated a predetermined number of times, for example, five times.

(605) When the peak power is accumulated a predetermined number of times, an average of peak power is obtained in each direction.
(606) The entire average Av of the peak power is obtained.
(607) The maximum value MaxPower of the peak power in each direction is computed.
(608) The minimum value MinPower of the peak power in each direction is computed.
(609) The difference (Dv=MaxPower−MinPower) between the maximum and minimum values is computed. Then, the processes in and after the process in (630) are performed using the FM-CW data.
(610) After processing (635) the FM-CW data, the slice processing is performed in the Av-Dv 2-dimensional plane. If it is determined that desensitization has been detected after the Av-Dv 2-dimensional slice processing is performed, then the processes after the slice processing (619) using the FM-CW data are performed. If it is determined that a normal sensitivity has been detected, control is passed to the process in (622).
(611) If it is determined that no desensitization is detected as a result of the slice processing in the 2-dimensional plane of Av-Dv, then a time series counter (realized by software provided in the CPU) is incremented. The processes can be performed from the slice processing (620), the slice processing (624), the slice processing (625), and the slice processing (628).
(612) The time series counter is treated in the slice processing. If the time series counter value has not reached a predetermined value, control is passed to (601).
(613) If it is determined that the time series counter value has reached a predetermined value, a desensitization diagram counter is reset.
(614) The time series counter is reset, and control is returned to the step of reading FFT data.
(615) If desensitization is determined after the slice processing in a two-dimension after the slice processing on the FM-CW data, then the desensitization diagram counter is incremented by a predetermined value to check whether or not the desensitization continues.
(616) To determine whether or not desensitization is continuously determined, a variable referred to as a time series counter is provided and reset (set to 0).
(617) The slice processing is performed on the desensitization diagram counter. If desensitization is detected, the desensitization diagram counter is incremented with time, and the slice processing detects it. If non-desensitization is detected in the slice processing, control is returned to the step of reading FFT data.
(618) When the desensitization is detected, it is announced to the user and the control computer of a vehicle.

The processes are almost the same as in the first embodiment.

Figure 30:
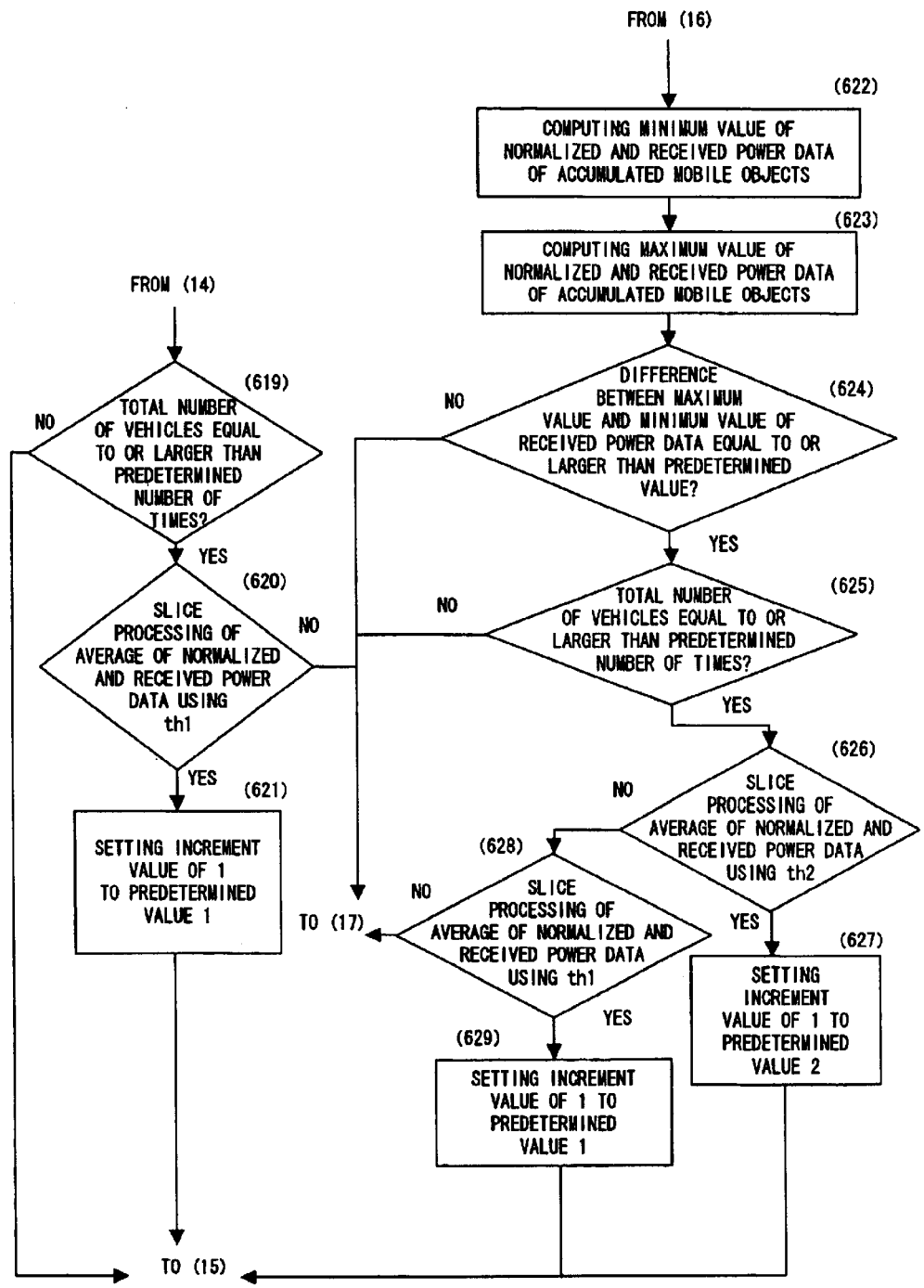
FIG. 30 is a view (2) showing the sixth embodiment of the present invention.
Figure 31:
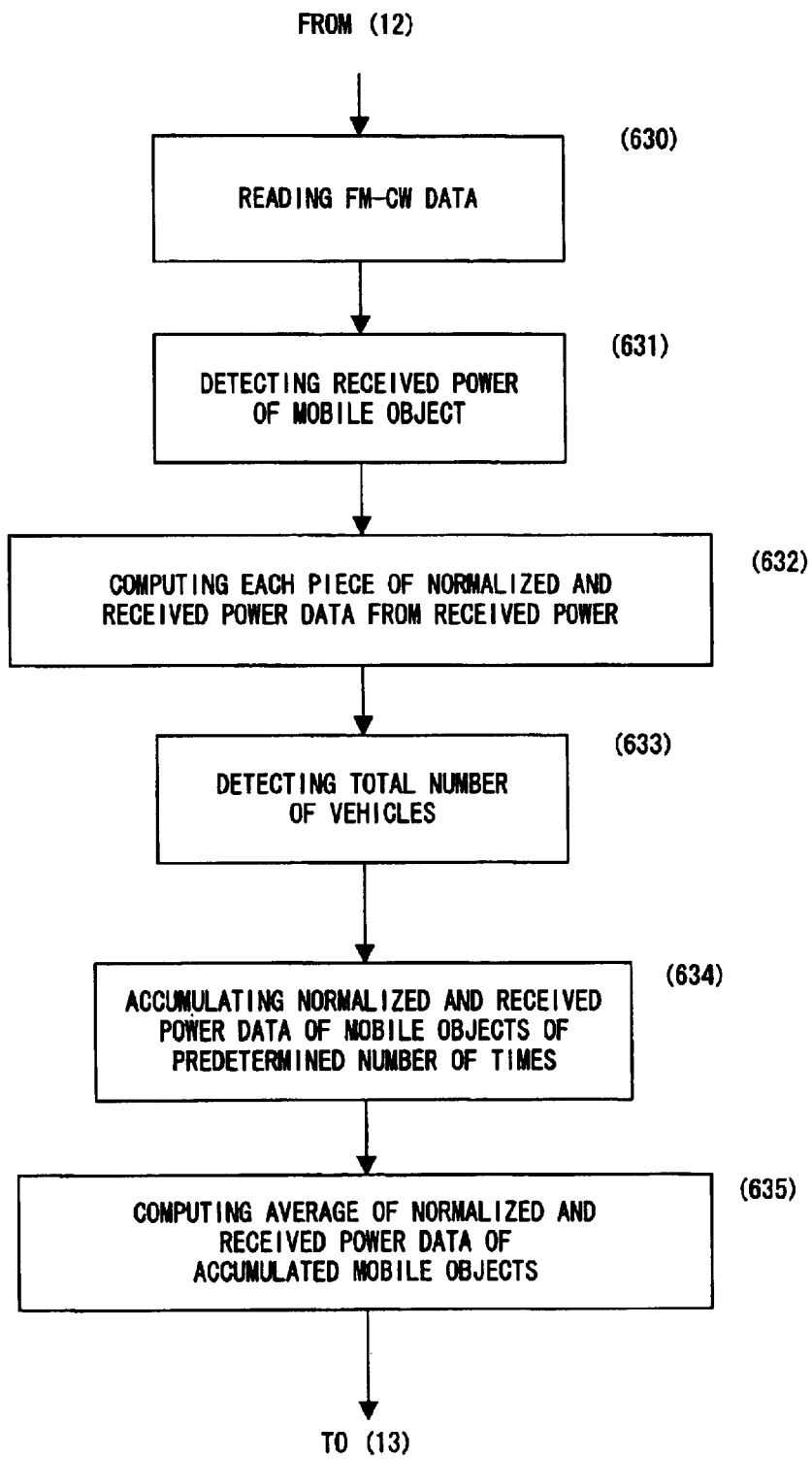
FIG. 31 is a view (3) showing the sixth embodiment of the present invention.
Figure 32:
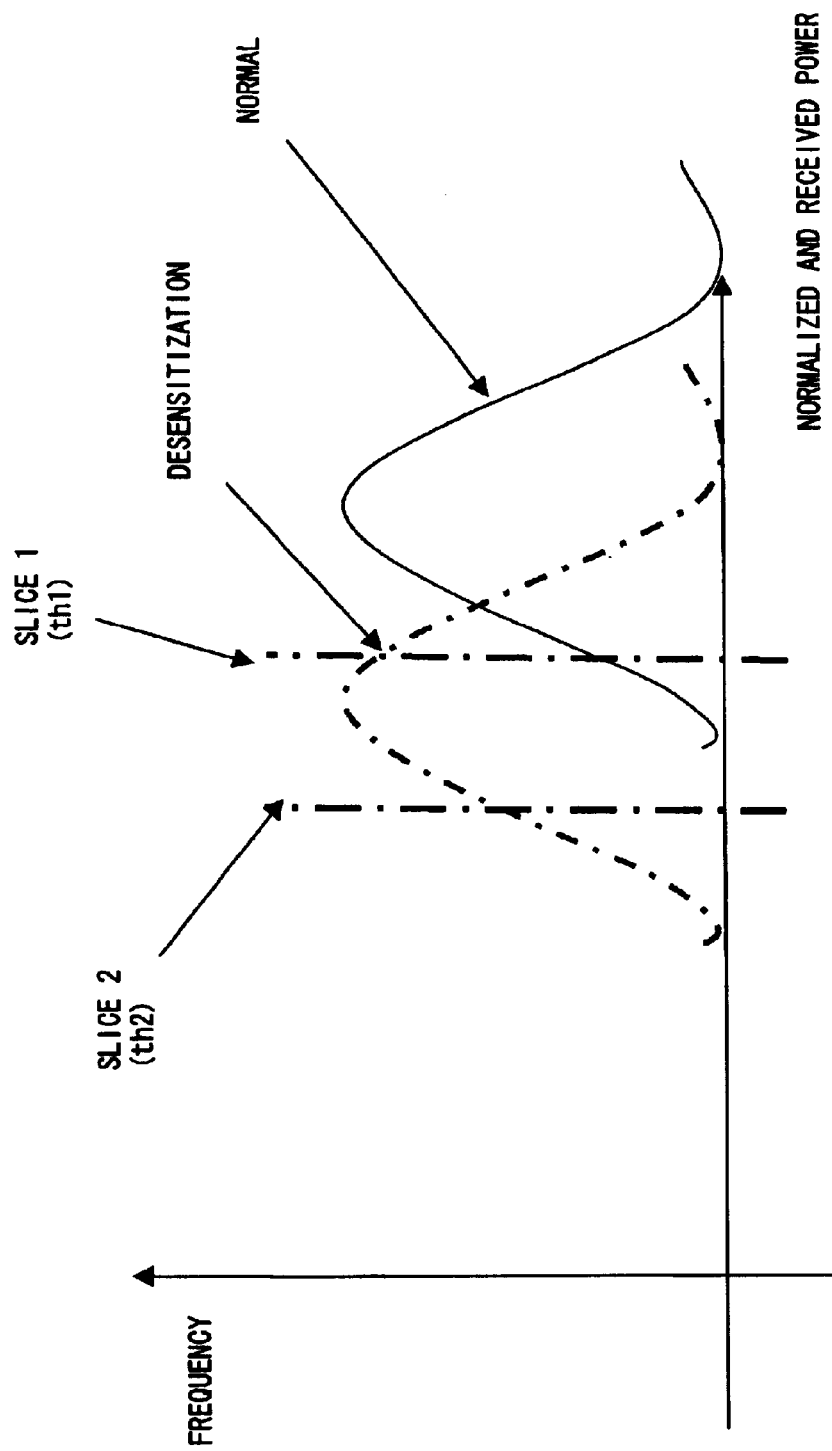
FIG. 32 is a view (4) showing the sixth embodiment of the present invention.

The process shown in FIG. 30 is described below.

(619) The slice processing is performed based on the total number of vehicles. If the total number of vehicles is equal to or smaller than a predetermined value, control is passed to (615). If the total number of vehicles is equal to or larger than the predetermined value, then control is passed to (620). When the total number of vehicles is small in the operation that is performed, for example, 20 times, obtained data is not reliable.
(620) The slice processing is performed on an average of normalized received power using a threshold th1. The center of the distribution differs between a normal case and a desensitized case. Therefore, the slice processing enables the normal and desensitized cases. When it is determined that data indicates a normal case, control is passed to the process in (611). When it is determined that data indicates desensitization, control is passed to the process in (621).
(621) The increment value of 1 of the desensitization diagram counter is set as a predetermined value 1.
(622) After the process of (610), the minimum value of the normalized and received power data of accumulated mobile objects is detected.
(623) The maximum value of the normalized and received power data of accumulated mobile objects is detected.
(624) The slice processing is performed on the difference between the maximum and minimum values. This process is performed to easily check the presence of a plurality of vehicles in the FM-CW data obtained as a result of performing the scanning operation several times.
(625) The slice processing is performed based on the total number of vehicles. If the total number of vehicles is equal to or smaller than a predetermined value, control is passed to (611). If the total number of vehicles is equal to or larger than the predetermined value, then control is passed to (626). When the total number of vehicles is small in the operation that is performed, for example, 20 times, obtained data is not reliable. However, it is not necessary that the slice values are the same.
(626) The slice processing using a threshold th2 is performed on an average of normalized received power data. FIG. 22 shows the slice value and the histogram. The center of the distribution differs between a normal case and a desensitized case. However, when the histogram is observed, an overlapping portion is detected in a range. If the average value is equal to or smaller than th2 where desensitization data is present in a range in which normal data is not detected, the increment value of the desensitization diagram counter is set high. In a portion in which normal and desensitization data somewhat overlap, the increment value of the desensitization diagram counter is set somewhat low. If it is determined that the value is larger than the slice value th2, control is passed to the process in (628). If it is determined that desensitization has been detected, then control is passed to the process in (627).
(627) The increment value of 1 of the desensitization diagram counter is set to a predetermined value 2. The predetermined value 2 is larger than the predetermined value 1.
(628) An average of the normalized and received power data is treated in the slice processing using the slice value th1. If it is determined that the value is larger than the slice value th1, control is passed to the process in (611). If it is determined that desensitization has been detected, then control is passed to the process in (629).
(629) The increment value of 1 of the desensitization diagram counter is set to a predetermined value 1. The predetermined value 1 is larger than the predetermined value 2.
(630) The data of the FM-CW radar is read.
(631) The received power of a mobile object is detected.
(632) The normalized received power is computed from the received power.
(633) The total number of vehicles is detected.
(634) The normalized received power data of the mobile objects is accumulated a predetermined number of times.
(635) An average of the normalized received power data of accumulated mobile objects is computed. Then, control is passed to (610).

As described above, when the desensitization is detected using the FM-CW data and the power level is very low, the announcement timing can be set earlier.

In the above-mentioned embodiment, the slice processing that is performed when it is determined whether or not the desensitization is detected is performed on a plane having two variables. However, it is not limited to a 2-dimensional plane. That is, the slice processing can be performed in a 3 or higher dimensional space with a larger number of parameters used as determination references of desensitization.

Conventionally, the desensitization has possibly been erroneously detected or not detected occasionally. However, using the signal processing according to the present invention, etc., these problems have been solved, and the erroneous detection of desensitization or failure to detect desensitization can be reduced.

What is claimed is:

1. A signal processing apparatus, comprising:
    a radio radar unit emitting/receiving radio waves in different directions;
    a parameter extraction unit extracting a plurality of parameters relating to deterioration of radar sensitivity from received radio waves obtained from different directions; and
    a determination unit determining whether received power of received waves indicates deterioration of radar sensitivity of radio radar using a threshold not constant at least for one parameter in a multidimensional space representing the plurality of parameters using coordinate axes.

2. The apparatus according to claim 1, wherein said parameter is an average of a normalized reception value of an object in a FM-CW mode.

3. The apparatus according to claim 1, wherein said parameter is an average received power value for a velocity of a vehicle of an observer in a CW mode in all directions and a difference between a maximum value and a minimum value of a received power value in each direction.

4. The apparatus according to claim 1, wherein said parameter is an average received power value for a velocity of a vehicle of the apparatus in a CW mode in all directions and a standard deviation or a variance of received power in each direction.

5. The apparatus according to claim 1, wherein said parameter is an average received power value for a velocity of a vehicle of an observer in a CW mode in all directions and a coefficient value of an approximate curve of a distribution along a direction of an average received power value in each direction.

6. The apparatus according to claim 1, wherein said radio radar has a CW mode using radio waves of continuous waves and an FM-CW mode using frequency modulated radio waves.

7. The apparatus according to claim 6, wherein a received power value obtained by a radio radar in the FM-CW mode is normalized into a received power value when a mobile object is within a predetermined distance.

8. The apparatus according to claim 7, wherein an estimated total number of mobile objects captured by a radio radar is computed by performing slice processing on the normalized and received power value, and it is determined that deterioration of radar sensitivity of the radio radar is detected when the estimated total number of the mobile objects equals or exceeds a predetermined value.

9. The apparatus according to claim 8, wherein it is determined that deterioration of radar sensitivity is detected when a distance between a maximum value and a minimum value of the normalized and received power value is equal to or smaller than a predetermined value.

10. The apparatus according to claim 6, wherein it is determined whether deterioration of radar sensitivity is detected using a parameter obtained in a CW mode and a parameter obtained in an FM-CW mode, and it is determined that deterioration of radar sensitivity of the radio radar is detected when deterioration of radar sensitivity is detected in both modes.

11. The apparatus according to claim 1, wherein said determination unit comprises a first counter for counting a value each time it is determined that deterioration of radar sensitivity is detected, and a second counter for counting a value each time it is determined that deterioration of radar sensitivity is not detected, and it is determined that deterioration of radar sensitivity is detected when the first counter exceeds a predetermined value.

12. The apparatus according to claim 11, wherein at least a first and a second threshold are used in determining that deterioration of radar sensitivity is detected, and counting step values of the second and first counters are increased respectively when an average received power value is larger than the first threshold and the average received power value is smaller than the second threshold.

13. A signal processing method, comprising:
    emitting/receiving radio waves using radio radar in different directions;
    extracting a plurality of parameters relating to deterioration of radar sensitivity from received radio waves obtained from different directions; and
    determining whether received power of received waves indicates deterioration of radar sensitivity of radio radar using a threshold not constant at least for one parameter in a multidimensional space representing the plurality of parameters using coordinate axes.

14. The method according to claim 13, wherein said parameter is an average of a normalized reception value of an object in a FM-CW mode.

15. The method according to claim 13, wherein said parameter is an average received power value for a velocity of a vehicle of the apparatus in a CW mode in all directions and a difference between a maximum value and minimum value of a received power value in each direction.

16. The method according to claim 13, wherein said parameter is an average received power value for a velocity of a vehicle of an observer in a CW mode in all directions and a standard deviation or a variance of received power in each direction.

17. The method according to claim 13, wherein said parameter is an average received power value for a velocity of a vehicle of an observer in a CW mode in all directions and a coefficient value of an approximate curve of a distribution along a direction of an average received power value in each direction.

18. The method according to claim 13, wherein said radio radar has a CW mode using radio waves of continuous waves and an FM-CW mode using frequency modulated radio waves.

19. The method according to claim 18, wherein a received power value obtained by a radio radar in the FM-CW mode is normalized into a received power value when a mobile object is within a predetermined distance.

20. The method according to claim 19, wherein an estimated total number of mobile objects captured by a radio radar is computed by performing slice processing on the normalized and received power value, and it is determined that deterioration of radar sensitivity of the radio radar is detected when the estimated total number of the mobile objects equals or exceeds a predetermined value.

21. The method according to claim 20, wherein it is determined that deterioration of radar sensitivity is detected when a distance between a maximum value and a minimum value of the normalized and received power value is equal to or smaller than a predetermined value.

22. The method according to claim 18, wherein it is determined whether deterioration of radar sensitivity is detected using a parameter obtained in a CW mode and a parameter obtained in an FM-CW mode, and it is determined that deterioration of radar sensitivity of the radio radar is detected when deterioration of radar sensitivity is detected in both modes.

23. The method according to claim 13, wherein in said determination step, a first counter value for use in counting a value each time is used to determine that deterioration of radar sensitivity is detected, and a second counter value for use in counting a value each time is used to determine that deterioration of radar sensitivity is not detected, and it is determined that deterioration of radar sensitivity is detected when the first counter exceeds a predetermined value.

24. The method according to claim 23, wherein at least a first and a second threshold are used in determining that deterioration of radar sensitivity is detected, and counting step values of the second and first counters are increased respectively when an average received power value is larger than the first threshold and the average received power value is smaller than the second threshold.

25. A program embodied on at least one computer-readable medium storing instructions to direct a computer to execute a process comprising:

emitting/receiving radio waves using radio radar in different directions;

extracting a plurality of parameters relating to deterioration of radar sensitivity from received radio waves obtained from different directions; and determining whether received power of received waves indicates deterioration of radar sensitivity of radio radar using a threshold not constant at least for one parameter in a multidimensional space representing the plurality of parameters using coordinate axes.

* * * * *